United States Patent [19]
Tom et al.

[11] Patent Number: 5,704,965
[45] Date of Patent: Jan. 6, 1998

[54] FLUID STORAGE AND DELIVERY SYSTEM UTILIZING CARBON SORBENT MEDIUM

[75] Inventors: Glenn M. Tom, New Milford; James V. McManus, Danbury, both of Conn.; W. Karl Olander, Tampa, Fla.

[73] Assignee: Advanced Technology Materials, Inc., Danbury, Conn.

[21] Appl. No.: 650,634

[22] Filed: May 20, 1996

Related U.S. Application Data

[63] Continuation-in-part of PCT/US95/13040, Oct. 13, 1995, continuation-in-part of Ser. No. 322,224, Oct. 13, 1994, Pat. No. 5,518,528.

[51] Int. Cl.$^6$ .................................................. B01D 53/04
[52] U.S. Cl. ............................... 95/95; 95/106; 95/115; 95/133; 95/902; 95/126; 95/130; 95/143; 206/7
[58] Field of Search ..................... 95/95, 96, 103, 95/106, 114, 115, 127, 131–133, 148, 902; 96/108, 121, 122, 126–128, 130–132, 143, 146, 147; 206/0.7

[56] References Cited

U.S. PATENT DOCUMENTS

| | | | |
|---|---|---|---|
| 240,423 | 4/1881 | James | 206/0.7 X |
| 1,608,155 | 11/1926 | Barnebey | 206/0.7 X |
| 2,356,334 | 8/1944 | Maude et al. | 206/0.7 X |
| 2,663,626 | 12/1953 | Spangler | 206/0.7 X |
| 2,987,139 | 6/1961 | Bush | 95/133 |
| 2,997,371 | 8/1961 | Wadsworth et al. | 95/131 X |
| 3,006,153 | 1/1961 | Cook | 206/0.7 X |
| 3,116,132 | 12/1963 | Haller et al. | 95/132 X |
| 3,144,200 | 8/1964 | Taylor et al. | 96/108 X |
| 3,287,432 | 11/1966 | Sensel | 95/95 |
| 3,675,392 | 7/1972 | Reighter | 95/96 |
| 3,713,273 | 1/1973 | Coffee | 96/128 X |
| 3,719,026 | 3/1973 | Sand | 95/106 |
| 3,788,036 | 1/1974 | Lee et al. | 96/130 X |
| 4,023,701 | 5/1977 | Dockery | 206/97 X |
| 4,263,018 | 4/1981 | McCombs et al. | 96/130 X |
| 4,343,770 | 8/1982 | Simons | 206/0.7 X |
| 4,414,005 | 11/1983 | DeBiévre et al. | 95/127 |
| 4,578,256 | 3/1986 | Nishino et al. | 95/133 X |
| 4,744,221 | 5/1988 | Knollmueller | 62/48 |
| 4,749,384 | 6/1988 | Nowobilski et al. | 96/108 X |
| 4,761,395 | 8/1988 | Tom et al. | 502/401 |
| 5,051,117 | 9/1991 | Prigge et al. | 95/95 |
| 5,089,244 | 2/1992 | Parent et al. | 95/133 X |
| 5,133,787 | 7/1992 | Diot et al. | 96/121 |
| 5,151,395 | 9/1992 | Tom | 502/67 |
| 5,385,689 | 1/1995 | Tom et al. | 252/194 |
| 5,409,526 | 4/1995 | Zheng et al. | 96/132 |
| 5,417,742 | 5/1995 | Tamhankar et al. | 95/96 |
| 5,518,528 | 5/1996 | Tom et al. | 95/103 |

FOREIGN PATENT DOCUMENTS

| | | | |
|---|---|---|---|
| 1095796 | 12/1960 | Germany | 95/133 |
| 2264512 | 1/1974 | Germany | 95/133 |
| 3139-781 | 4/1983 | Germany | 96/122 |
| 52-72373 | 6/1977 | Japan | 96/130 |
| 63-88017 | 4/1988 | Japan | 96/121 |
| 3-127606 | 5/1991 | Japan | 96/108 |
| 1181692A | 9/1985 | U.S.S.R. | 95/133 |
| 1544475A1 | 2/1990 | U.S.S.R. | 95/131 |
| 1583151A1 | 8/1990 | U.S.S.R. | 95/133 |

*Primary Examiner*—Robert Spitzer
*Attorney, Agent, or Firm*—Steven J. Hultquist; Janet R. Elliott

[57] ABSTRACT

An adsorption-desorption apparatus, for storage and dispensing of a sorbable gas, wherein a carbon physical sorbent medium bearing the adsorbed gas to be selectively dispensed is delivered by pressure differential desorption and/or thermal desorption of the sorbate gas from the sorbent material. The carbon sorbent material preferably comprises a material which is characterized by a Sorbent Working Capacity, measured for arsine at 40 Torr and at 650 Torr, of at least 100 grams arsine per liter of bed of the sorbent material, e.g., a carbon sorbent material having the adsorption isotherm characteristic of curve A in FIG. 1 herein.

50 Claims, 8 Drawing Sheets

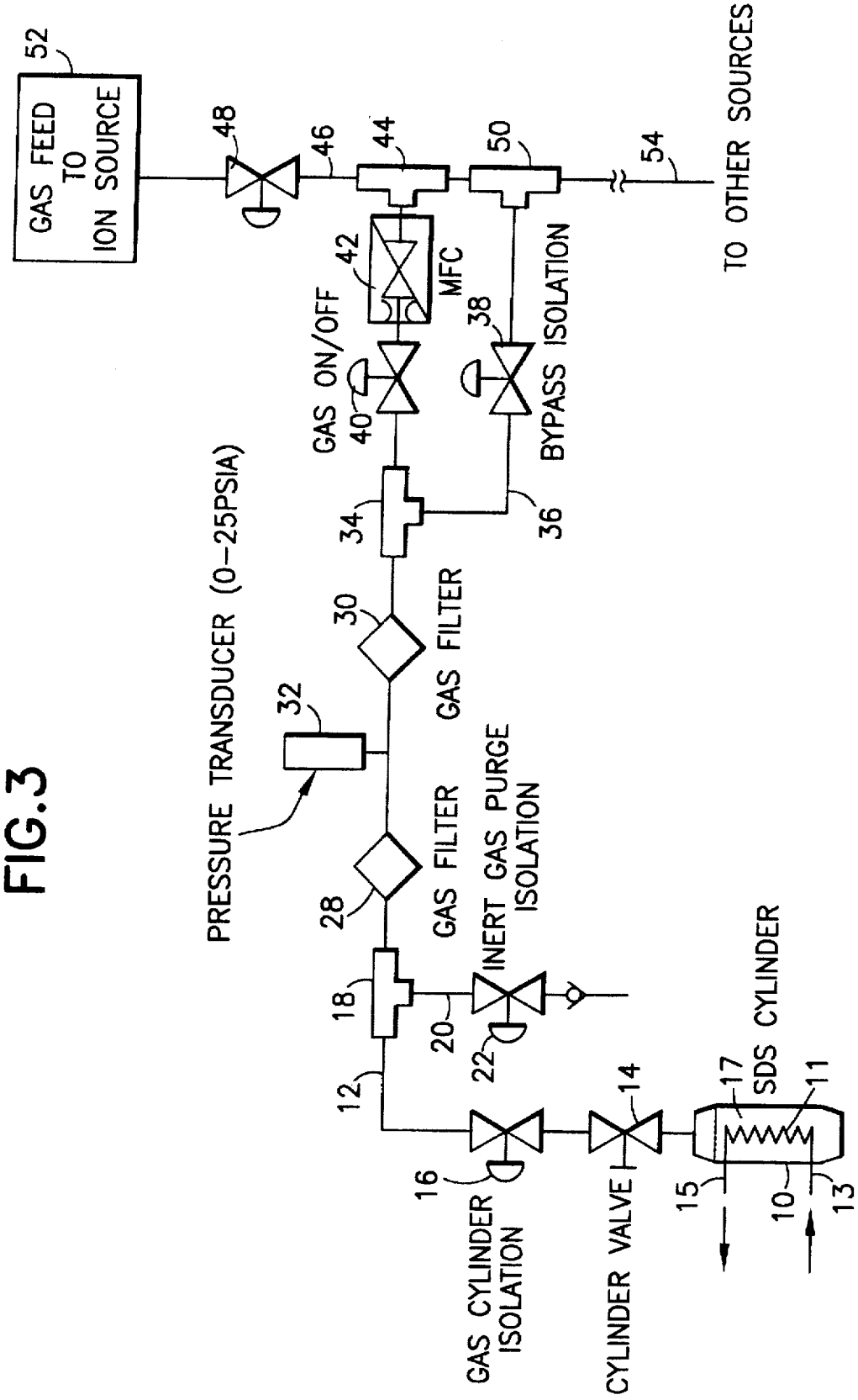

FLUID STORAGE AND DELIVERY SYSTEM UTILIZING CARBON SORBENT MEDIUM

CROSS-REFERENCE TO RELATED APPLICATIONS

This is a continuation-in-part of International Patent Application No. PCT/US95/13040 filed Oct. 13, 1995 designating the United States as a Designated State, based on and claiming the priority of U.S. patent application No. 08/322,224 filed Oct. 13, 1994, and issued May 21, 1996 as U.S. Pat. No. 5,518,528. This also is a continuation-in-part of U.S. patent application No. 08/322,224 filed Oct. 13, 1994, and issued May 21, 1996 as U.S. Pat. No. 5,518,528.

BACKGROUND OF THE INVENTION

1. Field of the Invention

This invention relates generally to storage and dispensing systems for the selective dispensing of fluids from a vessel or storage container in which the fluid component(s) are held in sorptive relationship to a solid sorbent medium, and are desorptively released from the sorbent medium in the dispensing operation.

2. Description of the Related Art

In a wide variety of industrial processes and applications, there is a need for a reliable source of process fluid(s).

Such process and application areas include semiconductor manufacturing, ion implantation, manufacture of flat panel displays, medical intervention and therapy, water treatment, emergency breathing equipment, welding operations, space-based delivery of liquids and gases, etc.

U.S. Pat. No. 4,744,221 issued May 17, 1988 to Karl O. Knollmueller discloses a method of storing and subsequently delivering arsine, by contacting arsine at a temperature of from about −30° C. to about +30° C. with a zeolite of pore size in the range of from about 5 to about 15 Angstroms to adsorb arsine on the zeolite, and then dispensing the arsine by heating the zeolite to an elevated temperature of up to about 175° C. for sufficient time to release the arsine from the zeolite material.

The method disclosed in the Knollmueller patent is disadvantageous in that it requires the provision of heating means for the zeolite material, which must be constructed and arranged to heat the zeolite to sufficient temperature to desorb the previously sorbed arsine from the zeolite in the desired quantity.

The use of a heating jacket or other means exterior to the vessel holding the arsine-bearing zeolite is problematic in that the vessel typically has a significant heat capacity, and therefore introduces a significant lag time to the dispensing operation. Further, heating of arsine causes it to decompose, resulting in the formation of hydrogen gas, which introduces an explosive hazard into the process system. Additionally, such thermally-mediated decomposition of arsine effects substantial increase in gas pressure in the process system, which may be extremely disadvantageous from the standpoint of system life and operating efficiency, as well as safety concerns.

The provision of interiorly disposed heating coil or other heating elements in the zeolite bed itself is problematic since it is difficult with such means to uniformly heat the zeolite bed to achieve the desired uniformity of arsine gas release.

The use of heated carrier gas streams passed through the bed of zeolite in its containment vessel may overcome the foregoing deficiencies, but the temperatures necessary to achieve the heated carrier gas desorption of arsine may be undesirably high or otherwise unsuitable for the end use of the arsine gas, so that cooling or other treatment is required to condition the dispensed gas for ultimate use.

U.S. Pat. No. 5,518,528 issued May 21, 1996 in the names of Glenn M. Tom and James V. McManus, describes a gas storage and dispensing system, for the storage and dispensing of gases, which overcomes the above-discussed disadvantages of the gas supply process disclosed in the Knollmueller patent. The gas storage and dispensing system of the Tom et al. patent comprises an adsorption-desorption apparatus, for storage and dispensing of a gas, e.g., a gas selected from the group consisting of hydride gases, halide gases, and organometallic Group V compounds, including: a storage and dispensing vessel constructed and arranged for holding a solid-phase physical sorbent medium, and for selectively flowing gas into and out of said vessel; a solid-phase physical sorbent medium disposed in said storage and dispensing vessel at an interior gas pressure; a sorbate gas physically adsorbed on the solid-phase physical sorbent medium; a dispensing assembly coupled in gas flow communication with the storage and dispensing vessel, and constructed and arranged to provide, exteriorly of the storage and dispensing vessel, a pressure below said interior pressure, to effect desorption of sorbate gas from the solid-phase physical sorbent medium, and gas flow of desorbed gas through the dispensing assembly; wherein the solid-phase physical sorbent medium is devoid of trace components such as water, metals, and oxidic transition metal species (e.g., oxides, sulfites and/or nitrates) which would otherwise decompose the sorbate gas in the storage and dispensing vessel.

By the elimination of such trace components from the solid-phase physical sorbent medium, the decomposition of the sorbate gas after 1 year at 25° C. and interior pressure conditions is maintained at extremely low levels, e.g., so that not more than 1–5% by weight of the sorbate gas is decomposed.

The storage and dispensing vessel of the Tom et al. patent thus embodies a substantial advance in the art, relative to the prior art use of high pressure gas cylinders. Conventional high pressure gas cylinders are susceptible to leakage from damaged or malfunctioning regulator assemblies, as well as to rupture if internal decomposition of the gas leads to rapid increasing interior gas pressure in the cylinder and the risk of cylinder rupture or other unwanted bulk release of gas from the cylinder.

The gas storage and dispensing vessel of the Tom et al. patent reduces the pressure of stored sorbate gases by reversibly adsorbing them onto a carrier sorbent medium such as a zeolite or activated carbon material. Other objects and advantages of the invention will be more fully apparent from the ensuing disclosure and appended claims.

There is a continuing need in the art to identify and utilize improved sorbent materials in fluid storage and delivery systems of the type hereinabove described, and it is accordingly an object of the present invention to provide a fluid storage and dispensing system utilizing a high efficiency sorbent material which offers significant advantages in cost, ease of use, and performance characteristics.

Other objects and advantages of the invention will be more fully apparent from the ensuing disclosure and appended claims.

SUMMARY OF THE INVENTION

The present invention contemplates a system for storage and dispensing of a sorbable fluid, e.g., a gas, vapor, liquid, multiphase fluid, etc., including fluid mixtures as well as single component fluids.

The fluid storage and dispensing system of the invention comprises a storage and dispensing vessel constructed and arranged for holding a solid-phase physical sorbent medium having a sorptive affinity for the sorbable fluid, and for selectively flowing sorbable fluid into and out of such vessel. A solid-phase physical sorbent medium having a sorptive affinity for the fluid is disposed in the storage and dispensing vessel at an interior gas pressure, and fluid physically adsorbed on said solid-phase physical sorbent medium. A dispensing assembly is coupled in gas flow communication with the storage and dispensing vessel. The dispensing assembly may be constructed and arranged to provide, exteriorly of the storage and dispensing vessel, a pressure below the interior pressure, to effect desorption of fluid from the solid-phase physical sorbent medium, and fluid flow of desorbed fluid through the dispensing assembly. Alternatively, the storage and dispensing system may comprise means for selectively heating the sorbent material, to effect desorption of the fluid from the solid-phase physical sorbent medium, together with a dispensing assembly coupled in gas flow communication with the storage and dispensing vessel which is constructed and arranged to accommodate fluid flow of desorbed fluid through the dispensing assembly when thermally desorbed. As a still further alternative, the storage and dispensing system of the invention may be constructed and arranged to effect a combination of thermal and pressure differential desorption of the fluid from the solid-phase physical sorbent medium.

The dispensing assembly may comprise any appropriate conduits, pipes, tubing, flow channels, valving, instrumentation, monitoring means, flow regulators, pumps, blowers, aspirators, or the like, as appropriate to the specific end use application of the fluid storage and dispensing assembly of the present invention. The invention may be configured in any suitable conformation or size of storage and dispensing vessel, such as a vessel having an interior volume on the order of from about 0.01 liter to about 20 liters.

In a specific aspect, the present invention relates to a fluid storage and dispensing system of the above-described type, utilizing as the solid-phase physical sorbent medium a carbon sorbent material. A wide variety of carbon sorbents are employable as efficient sorption media in the storage and dispensing system of the invention.

Performance characteristics applicable to carbon sorbents in the storage and dispensing applications of the present invention include Sorbent Loading Capacity (amount of sorbate fluid which is stored on the sorbent, per unit weight of sorbent material), and Sorbent Working Capacity, $C_w$, defined as the weight of sorbate originally loaded on the sorbent material which is removable from the sorbent medium in the fluid dispensing operation, at given pressure and temperature conditions, per unit volume of the sorbent material, i.e., $C_w$=[Weight of Sorbate - Weight of Sorbate Remaining After Desorption]/(Volume of Adsorbent)

where sorbate weights at loading and after desorption are measured in grams, and adsorbent volume is measured in liter units.

Another measure of the efficacy of carbon sorbent materials generally usefully employable in the broad practice of the invention is Percent Desorbable Sorbate of the carbon material, defined as the percentage of the sorbate gas which is loaded on the sorbent material which is subsequently desorbable solely by pressure desorption, at a specified temperature, i.e., Percent Desorbable Sorbate={(Weight of Sorbate - Weight of Sorbate Remaining After Desorption)/(Weight of Sorbate)}×100%

The Percent Desorbable Sorbate desirably is on the order of at least 15%, preferably at least 25%, more preferably at least 50%, and most preferably at least 60%.

Additionally, the carbon sorbent material employed in the practice of the invention desirably has the characteristic of readily sorbing the sorbate fluid in the first instance, at suitably high rate, and correspondingly releasing the previously sorbed fluid in a rapid manner in response to a pressure differential between the interior volume of the storage and dispensing vessel and an exterior locus at lower pressure, when the storage and dispensing system is in a fluid dispensing mode of operation.

Carbon sorbent materials useful in the fluid storage and dispensing system of the invention include carbon materials having a pore volume (cumulative void volume) in the range of from about 0.1 to about 5.0 cubic centimeters, preferably from about 0.5 to about 2.0 cubic centimeters, of pore volume per gram of sorbent material. The carbon sorbent material desirably has a major fraction, i.e. more than 50% of its pore volume, comprised of pores having a diameter in the range of from about 2 Angstroms to 100 Angstroms, with preferably more than 80%, and most preferably substantially all of the pore volume of the carbon sorbent, being in such range.

Preferred materials include carbon sorbents having an average pore diameter in the range of from about 2 to about 20 Angstroms, and a major fraction of the pore volume within such range, more preferably more than 80%, and most preferably substantially all of its pore volume being in such range.

High performance carbon sorbents useful in the broad practice of the present invention include those having a Sorbent Working Capacity, $C_w$, measured for arsine gas at 40 Torr and at 650 Torr, of at least 100, preferably at least 150, more preferably at least 180, and most preferably at least 200, grams arsine per liter of sorbent material, measured as $C_w$=(Weight of arsine gas, in grams, on one liter of sorbent at 650 Torr and 25° C.) −(Weight of arsine gas, in grams, on one liter of sorbent at 50 Torr and 25° C.)

where arsine is the reference fluid for such $C_w$ characterization and the liter basis of the sorbent is the volume in bed form including void or interstitial space of the bed of particulate carbon sorbent medium.

It is to be noted that the working capacity can be significantly increased by reducing the pressure level to low levels down to as low as 1 Torr.

The carbon sorbent materials useful in the fluid storage and dispensing system of the invention may have any suitable size, shape, and conformation, including beads, granules, pellets, tablets, powders, particulates, extrudates, cloth or web form materials, honeycomb matrix monolith, and composites (of the carbon sorbent with other components), as well as comminuted or crushed forms of the foregoing conformations of carbon sorbent materials. Preferred carbon sorbent materials include bead activated carbon materials, having a highly uniform spherical shape, with a particle size in the range of from about 0.1 millimeter to 1 centimeter diameter, and more preferably from about 0.25 to about 2 millimeters diameter.

In another aspect, again using arsine as the reference gas for the characterization, useful carbon sorbent materials in the fluid storage and dispensing system of the invention comprise carbon materials which have an arsine gas adsorption isotherm at 25° C., measured in grams of arsine adsorbed per liter of the sorbent, as a function of pressure in Torr, with the following adsorption loading characteristic:

| Pressure, Torr | Loading (grams of arsine per liter of sorbent) of at least: |
|---|---|
| 25 | 35 |
| 50 | 75 |
| 100 | 100 |
| 200 | 160 |
| 300 | 200 |
| 400 | 225 |
| 500 | 240 |
| 550 | 250 |
| 650 | ~300. |

Suitable carbon sorbent materials in the fluid storage and dispensing system of the invention may for example have the following adsorption loading characteristic at 25° C. temperature:

| Pressure, Torr | Loading (grams of arsine per liter of sorbent): |
|---|---|
| 25 | 35–60 |
| 50 | 75–100 |
| 100 | 100–115 |
| 200 | 160–175 |
| 300 | 200–220 |
| 400 | 225–245 |
| 500 | 240–260 |
| 550 | 250–275 |
| 650 | 260–300. |

Highly preferred carbon sorbent materials useful in the broad practice of the invention include materials having an adsorption isotherm for arsine gas, at 25° C., measured as grams of arsine adsorbed per liter of the sorbent, as a function of pressure in Torr, with the adsorption isotherm characteristic of curve A in FIG. 1 (by adsorption isotherm characteristic is meant the substantial shape of the adsorption isotherm in FIG. 1, since the adsorption isotherm will shift in the x and y directions with variation in temperature level, but its general shape will be substantially the same).

Carbon sorbents employable in the gas storage and dispensing system of the invention include sorbents characterizable by any suitable combination or permutation of sorbent characteristics variously described above.

The invention in another aspect contemplates an adsorption-desorption apparatus, for storage and dispensing of a gas, comprising:

a storage and dispensing vessel constructed and arranged for holding a solid-phase physical sorbent medium, and for selectively flowing gas into and out of said vessel;

a carbon sorbent material disposed in said storage and dispensing vessel at an interior gas pressure;

a sorbate fluid physically adsorbed on said carbon sorbent material;

a dispensing assembly coupled in gas flow communication with the storage and dispensing vessel, and constructed and arranged for selective on-demand dispensing of desorbed fluid, after thermal and/or pressure differential-mediated desorption of the fluid from the carbon sorbent material, with the dispensing assembly being constructed and arranged:

(I) to provide, exteriorly of said storage and dispensing vessel, a pressure below said interior pressure, to effect desorption of fluid from the carbon sorbent material, and flow of desorbed fluid from the vessel through the dispensing assembly; and/or (II) to flow thermally desorbed fluid therethrough, and comprising means for heating the carbon sorbent material to effect desorption of the fluid therefrom, so that the desorbed fluid flows from the vessel into the dispensing assembly.

Such carbon sorbent material desirably is devoid of trace components, such as those selected from the group consisting of water, metals, and oxidic transition metal species (e.g., oxides, sulfites and/or nitrates), sufficient in concentration to decompose the sorbate fluid in said storage and dispensing vessel.

In the storage and dispensing system of the invention, the concentration on the carbon sorbent material (based on the weight of the carbon sorbent material) of trace components selected from the group consisting of water and oxidic transition metal species, desirably is insufficient to decompose more than 5%, and preferably more than 1% by weight of the sorbate fluid after 1 year at 25° C. and said interior pressure. Such constraint on the carbon sorbent ensures that sorbate fluids such as hydride gases, e.g., arsine, phosphine, etc., which are otherwise susceptible to decomposition in the presence of water, metals, and oxidic transition metal species (e.g., oxides, sulfites and/or nitrates), are maintained free of substantial exposure to such species, so that significant levels of decomposition of the sorbate gas, and resulting pressure buildup problems, are avoided.

Preferably, the concentration of trace components selected from the group consisting of water, metals, and oxidic transition metal species, based on the weight of the carbon sorbent material, is insufficient to cause decomposition of the sorbate fluid resulting in more than a 25% rise, and preferably more than a 10% rise, in interior pressure after 1 week at 25° C. in the storage and dispensing vessel.

Carbon sorbent materials advantageously employed in the practice of the present invention include carbon materials which desirably contain less than 350, preferably less than 100, more preferably less than 10, and most preferably less than 1, part(s)-per-million by weight of trace components selected from the group consisting of water and oxidic transition metal species, based on the weight of the carbon sorbent medium.

Carbon sorbents are also characterizable by their ash content, which is a function of the origins of the specific carbon material. Preferred carbon materials have an ash content which is desirably below about 7% by weight, based on the total weight of the carbon sorbent, and most preferably below about 0.1% on the same weight basis. Some carbon sorbent materials have an ash content that is as high as 15%, but such carbon materials are generally less preferred than those having very low ash content therein.

Ash is inorganic material, such as silica, which can be detrimental in some adsorption applications, such as in the case of hydrogen fluoride and boron trifluoride, which will irreversibly chemisorb onto these compounds. Thus ash can decompose fluoride-containing gases. In the case of fluorides the interior pressure of the storage and dispensing system will actually decrease as the products of the reaction between the adsorbate and the impurities in the adsorbent yield involatile products.

Although the fluid storage and dispensing system of the invention is described hereinafter primarily with reference to dispensing of fluid from the vessel by pressure differential, it will be appreciated that the storage and dispensing system of the invention may effect dispensing solely by differential pressure desorption of the sorbate fluid, as well as thermally desorbing the fluid from the carbon sorbent material on which it previously has been sorbed. Alternatively, the desorption of the sorbate fluid from the carbon sorbent medium on which it is loaded, may be usefully carried out with a combination of pressure differential and thermally-mediated release of the sorbate from the sorbate medium.

The choice of the specific modality of desorption (pressure and/or thermal), and the appertaining process conditions therefor, may readily be selected and determined by the skilled artisan without undue experimentation, based on the nature of the sorbent material, the specific sorbate fluid, and the particular end use application in which the desorbed fluid is to be employed.

When the fluid storage and dispensing system of the invention is constructed and arranged to carry out thermal desorption of the fluid from the carbon sorbent material in the vessel, heating means may be operatively arranged in relation to the storage and dispensing vessel for selective heating of the carbon sorbent material, to effect thermally-enhanced desorption of the sorbate gas from the carbon sorbent material. The heating means may include electrical resistance heating elements, extended heat transfer surface members, radiative heating members, or other thermal actuatable heating means disposed in the sorbent bed in the storage and dispensing vessel, or otherwise arranged for transfer or in situ generation of heat to the sorbent material, to effect elevation of the temperature of the sorbent, and desorption of the sorbate fluid.

The carbon sorbent material employed in the practice of the invention may be suitably processed or treated to ensure that it is devoid of components or contaminants, e.g., trace components such as those discussed hereinabove, which would deleteriously affect the performance of the gas storage and dispensing system in respect of the sorption and desorption of the sorbate fluid. For example, the carbon sorbent may be subjected to washing treatment(s), e.g., with hydrofluoric acid, to render it sufficiently free of trace components such as metals and oxidic transition metal species.

The carbon sorbent material also may be variously treated to enhance the sorptive capacity and/or other performance characteristics of the sorbent. For example, the sorbent may be treated or reacted to functionalize the surface of the sorbent with chemical moieties which facilitate or enhance (1) sorption of a specific fluid on the sorbent medium when the sorbent is originally loaded with the fluid to be subsequently dispensed, and/or (2) desorption of the fluid when the sorbent is subjected to process conditions for dispensing the fluid from the storage and dispensing vessel. Additionally, the treatment may improve the purity of the desorbate. For example, reductive treatment of the surface oxide groups may be employed to reduce the amount of CO, $CO_2$, and hydrocarbon impurities in the desorbate.

Additionally, various temperature ranges may be employed during the degas procedure. Typically, carbon materials are degassed up to 500 degrees Centigrade, although higher temperature treatments may be applied.

Additional methods of modifying the sorbent material may be variously employed in the broad practice of the invention, including applying a sorption-enhancing material on the surfaces including the interior pore surfaces of the material. For example, an adsorption-enhancing liquid, solid, or semi-solid material may be applied to the carbon sorbent, to facilitate physical sorption of the fluid on solid sorption sites on the surfaces of the carbon sorbent, as well as sorption on or solubilization in the adsorption-enhancing material itself which has been applied to the surfaces of the sorbent.

The storage and dispensing system of the invention additionally may comprise the carbon sorbent material in the storage and dispensing vessel together with a chemisorbent material in the vessel having affinity for contaminants, e.g., decomposition products, of the sorbate gas therein. Such chemisorbent may for example comprise a solid sorbent composition having a chemisorbent affinity for non-inert atmospheric gases. Examples of potentially suitable chemisorbent materials include scavengers selected from the group consisting of:

(A) scavengers including a support having associated therewith, but not covalently bonded thereto, a compound which in the presence of such contaminant provides an anion which is reactive to effect the removal of such contaminant, said compound being selected from one or more members of the group consisting of:
  (i) carbanion source compounds whose corresponding protonated carbanion compounds have a $pK_a$ value of from about 22 to about 36; and
  (ii) anion source compounds formed by reaction of said carbanion source compounds with the sorbate gas; and (B) scavengers comprising:
  (i) an inert support having a surface area in the range of from about 50 to about 1000 square meters per gram, and thermally stable up to at least about 250° C.; and
  (ii) an active scavenging species, present on the support at a concentration of from about 0.01 to about 1.0 moles per liter of support, and formed by the deposition on the support of a Group IA metal selected from sodium, potassium, rubidium, and cesium and their mixtures and alloys and pyrolysis thereof on said support.

By way of further specific example, the chemisorbent material may advantageously comprise a scavenger component selected from the group consisting of: trityllithium and potassium arsenide.

In respect of the use of such chemisorbent materials for removing contaminants of the sorbate fluid to be dispensed, any of a wide variety of scavengers or chemisorbent materials may be employed, including scavenger compositions of the types disclosed and claimed in U.S. Pat. No. 4,761,395 issued Aug. 2, 1988 to Glenn M. Tom, et al., and U.S. patent application No. 08/084,414 filed Jun. 29, 1994, now U.S. Pat. No. 5,385,689 in the name of Glenn M. Tom and James V. McManus, the disclosures of which hereby are incorporated herein by reference.

The chemisorbent material when employed may be utilized as a separate bed in fluid flow communication with the bed of carbon sorbent material, or alternatively the chemisorbent may be dispersed randomly or selectively throughout a bed of carbon sorbent material in the storage and dispensing vessel.

The present invention also contemplates a process for supplying a fluid reagent, such process comprising:

providing a storage and dispensing vessel containing a carbon sorbent material having a physically sorptive affinity for said fluid reagent;

physically sorptively loading the fluid reagent on the carbon sorbent material, to yield a sorbate fluid-loaded carbon sorbent material;

desorbing sorbate fluid from the sorbate fluid-loaded carbon sorbent material, by reduced pressure (pressure differential) desorption and/or heating of the sorbent material; and dispensing the desorbed fluid from the storage and dispensing vessel.

In further preferred aspects, the carbon sorbent material may be of any of the specific carbon sorbent types (e.g., beads, granules, pellets, powders, extrudates, etc.) and possess any of the sorbent characteristics variously described hereinabove.

Fluids which may be usefully stored and subsequently dispensed from the storage and dispensing system of the invention include any suitable fluid, e.g., a gas, vapor, liquid, multiphase fluid, and fluid mixtures, which has sorptive affinity for the carbon sorbent material. Examples include acid and hydride gases, halide gases, vapor-phase organometallic compounds, oxidizing gases, etc.

Specific examples of sorbate gas species which are usefully storable and dispensable in the practice of the invention include silane, germane, arsine, phosphine, diborane, germane, ammonia, stibine, hydrogen sulfide, hydrogen selenide, hydrogen telluride, halide (chlorine, bromine, fluorine, and iodine) compounds, and organometallic compounds of metals such as aluminum, barium, strontium, gallium, indium, tungsten, antimony, silver, gold, palladium, gadolinium, etc.

The invention in another aspect relates to an adsorption-desorption apparatus, for storage and dispensing of fluid sorbable on a carbon sorbent material. Such apparatus comprises:

- a storage and dispensing vessel constructed and arranged for holding a carbon sorbent material, and for selectively flowing fluid into and out of the vessel;
- a carbon sorbent material disposed in the storage and dispensing vessel at an interior fluid pressure;
- a sorbate fluid physically adsorbed on the carbon sorbent material;
- a dispensing assembly coupled in fluid flow communication with the storage and dispensing vessel, and constructed and arranged to provide, exteriorly of the storage and dispensing vessel, a pressure below said interior pressure, to effect desorption of sorbate gas from the carbon sorbent material, and gas flow of desorbed gas through the dispensing assembly; and
- a cryopump coupled to the dispensing assembly for pressurizing the desorbed gas and discharging the resultingly pressurized gas.

In a further process aspect, the present invention relates to a process for storage and dispensing of fluid sorbable on a carbon sorbent material, comprising:

providing a storage and dispensing vessel holding a carbon sorbent material;

adsorbing such fluid on the carbon sorbent material;

establishing, exteriorly of the storage and dispensing vessel, a pressure below the interior pressure, to effect desorption of sorbate fluid from the carbon sorbent material, and flowing desorbed fluid out of the storage and dispensing vessel; and cryopumping the desorbed fluid from the storage and dispensing vessel to a predetermined pressure, wherein such predetermined pressure is higher than the pressure of the desorbed fluid flowed out of the storage and dispensing vessel.

Other aspects, features and embodiments of the invention will be more fully apparent from the ensuing disclosure and appended claims.

BRIEF DESCRIPTION OF THE DRAWINGS

FIG. 3 is a schematic representation of a storage and delivery system according to one embodiment of the invention.

DETAILED DESCRIPTION OF THE INVENTION, AND PREFERRED EMBODIMENTS THEREOF

Figure 1:
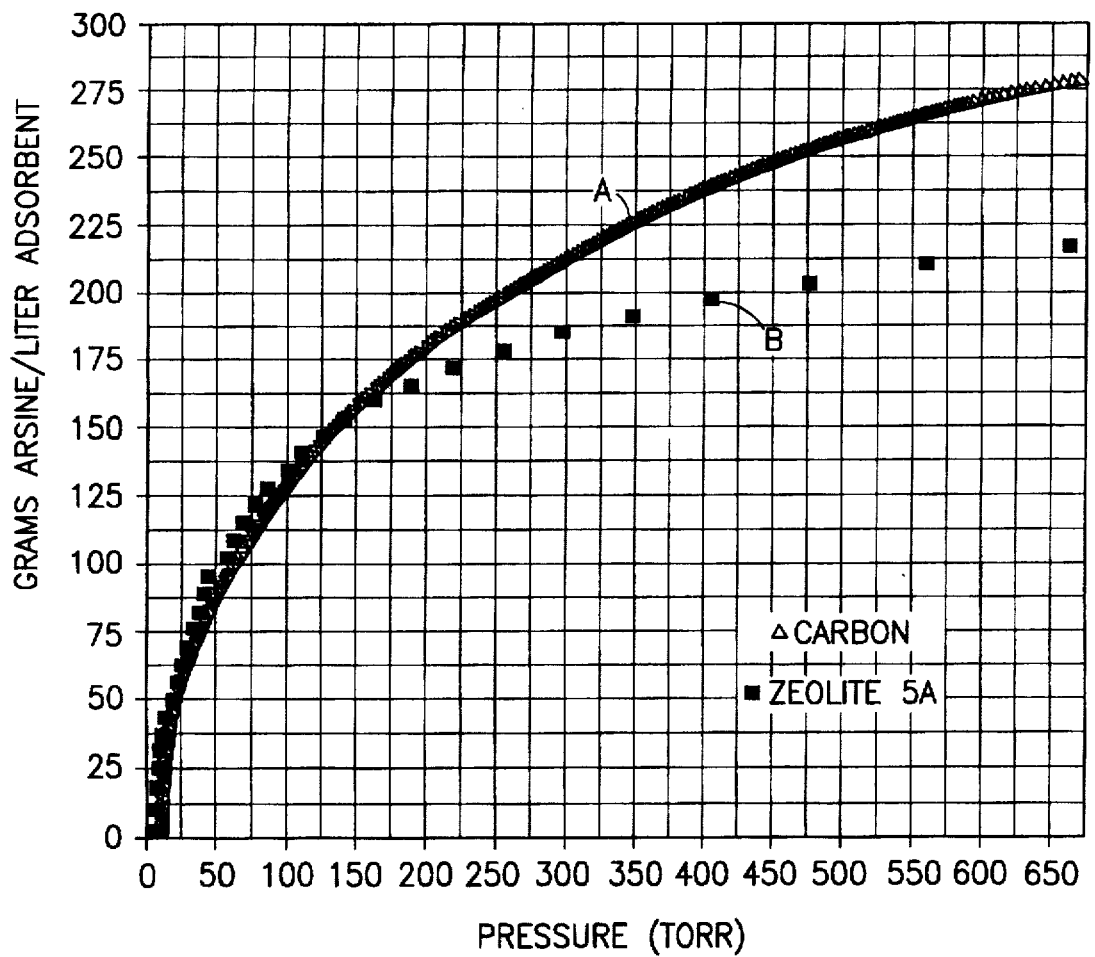
FIG. 1 shows a graph of the adsorption isotherm for arsine, as a plot of the arsine loading in grams arsine per liter of sorbent material, as a function of the pressure in Torr, for a carbon sorbent (curve A) and for zeolite 5A (curve B).

The disclosure of International Patent Application No. PCT/US95/13040 filed Oct. 13, 1995 designating the United States as a Designated State and published Apr. 25, 1996, and the disclosure of U.S. patent application No. 08/322,224 filed Oct. 13, 1994, and issued May 21, 1996 as U.S. Pat. No. 5,518,528, are hereby incorporated herein by reference in their entirety.

The present invention provides a new low pressure storage and delivery system as a source fluid supply means for applications such as ion implantation of hydride and halide gases, and organometallic Group V compounds. Illustrative examples of the foregoing include arsine, phosphine, germane, chlorine, $NF_3$, $BF_3$, $BCl_3$, diborane ($B_2H_6$ and its deuterium analog, $B_2D_6$), HCl, HBr, HF, HI, tungsten hexafluoride, and $(CH_3)_3Sb$.

As used herein, the term "low pressure" means a pressure not substantially exceeding 1 atmosphere, e.g., a pressure $\leq 1.25$ atmosphere, more preferably a pressure $\leq 1.0$ atmosphere, and most preferably a pressure within the range of from about 0.15 to about 0.8 atmosphere.

It will be recognized that the storage and dispensing system of the present invention may be operated at higher pressures than in the above-described low pressure regime, within the broad practice of the invention, however such storage and dispensing system has particular utility in applications in which the fluid is employed at subatmospheric pressure, as for example in ion implantation applications. In such end usage, the system of the invention permits fluid to be stored and dispensed at low pressure.

By such low pressure operation, the system of the invention obviates the necessity in many applications for high pressure fluid vessels of the prior art which heretofore have been used in such applications. Particularly where hazardous gases are involved, the use of high pressure vessels entails an enhanced risk of leakage and harm to persons and/or property, relative to the low pressure system of the present invention, where the fluid medium may be stored at near ambient pressure levels, and dispensed in a ready and controllable manner.

The fluid source system of the invention comprises a leak-tight vessel, such as a gas cylinder, containing the fluid to be dispensed, e.g., arsine boron trifluoride, germane, etc., adsorbed into a sorbent material comprising a carbonaceous physical adsorbent material. In the case of gaseous sorbates, such as arsine and phosphine, the carbonaceous sorbent reduces the vapor pressure of the sorbate gas to $\leq 1$ atmosphere.

While the invention is discussed primarily hereinafter in terms of the storage and delivery of arsine and phosphine gases, it will be recognized that the utility of the present invention is not thus limited, but rather extends to and is inclusive of a wide variety of other gases. Illustrative examples include silane, diborane, arsine, phosphine, chlorine, $BCl_3$, $BF_3$, $B_2D_6$, tungsten hexafluoride, hydrogen fluoride, hydrogen chloride, hydrogen iodide, hydrogen bromide, germane, $GeF_4$, $SiF_4$, and the deuterated hydrides, ammonia, stibine, hydrogen sulfide, hydrogen selenide, hydrogen telluride, and corresponding and other halide (chlorine, bromine, iodine, and fluorine) gaseous compounds such as $NF_3$, and organometallic Group V compounds such as $(CH_3)_3Sb$.

The novel means and method of the present invention for storing and delivering fluids at $\leq 0$ psig greatly reduces the hazard posed by these fluids. The inventive technique involves the adsorption of these fluids into a carbonaceous physical adsorbent. By adsorbing the fluid into a carbonaceous solid physical sorbent, the vapor pressure of the fluid can be reduced to $\leq 0$ psig. The release potential from this system is greatly reduced as the driving force of pressure is eliminated.

Although carbon sorbent materials are known per se, and have been used for example in the treatment of effluent gas streams from a wide variety of industrial processes, e.g., for VOC abatement in the semiconductor industry by sorption of the VOC from the effluent stream onto very large beds of carbon, there nonetheless has been no carbon sorptive material-based storage and dispensing system for supplying fluid reagents and process gases in the first instance. Accordingly, the present invention represents a substantial advance in the art, by utilizing carbon sorbent materials which are readily commercially available in a wide variety of sizes, shapes, surface areas, compositions, to provide an effective fluid supply system which obviates the dangers, deficiencies, and disadvantages of the prior art practice of supplying process gases and fluid reagents from pressurized cylinders.

The prior art has utilized gas cylinders extensively, for supplying welding gases, anesthesia gases, oxygen, chemical process reagent gases, etc., and has used cylinder vessels with extremely thick walls to contain the high pressures involved, since the cylinders supply capacity (amount of dispensable fluid) is a function of the pressure level in the cylinder, and increased pressure levels are consistent with increased cylinder dispensing capacity.

The present invention, by utilizing a sorptive medium, viz., a carbonaceous sorbent, avoids the process difficulties (including the risk of high pressure gas cylinder rupture, the risk of overpressure from decomposition of gases in situ, and the difficulties associated with monitoring and regulating very high pressure gases, which in the case of hazardous gases requires special safety and handling measures commensurate with the dangers involved). The sorptive medium of the invention permits ready storage of the fluid and easily effected pressure differential and/or thermal desorption dispensing.

As used herein, the term "carbonaceous" in reference to the physical sorbent material of the invention, means that the sorbent material comprises elemental carbon as its major component in the sorbent mass. Preferred forms of carbon sorbent materials include: carbon formed by pyrolysis of synthetic hydrocarbon resins such as polyacrylonitrile, sulfonated polystryrene-divinylbenzene, etc.; cellulosic char; charcoal; activated carbon formed from natural source materials such as coconut shells, pitch, wood, petroleum, coal, etc.

A preferred carbon sorbent material is activated carbon, a highly sorbent form of carbon produced by heating granulated charcoal to appropriate elevated temperature. Most preferred are the so-called bead carbon forms of activated carbon, where the beads, i.e., highly uniform diameter spherical particles, may have a diameter in the range of from about 0.1 to about 1 centimeter, and more preferably from about 0.25 to about 2 millimeters diameter.

Commercially available carbon sorbent materials which are preferred in the broad practice of the invention include bead carbon materials designated as BAC-MP, BAC-LP, and BAC-G-70R, available from Kureha Corporation of America, New York, N.Y.; Ambersorb® carbonaceous sorbents commercially available from Rohm & Haas Company, Philadelphia, Pa. as grades Ambersorb® 563, Ambersorb® 564, Ambersorb® 348F, Ambersorb® 575, Ambersorb® 572, and Ambersorb® 1500; Calgon Filtrasorb 400® and BPL GAC carbon sorbent materials commercially available from Calgon Carbon Corporation; and bead activated carbon sorbent materials commercially available from Blucher GmbH, Erkrath, Germany. The aforementioned Ambersorb materials have substantial pore volume in pores greater than 50 Angstroms, and in general such large pore sized materials are less preferred than those having pores not exceeding about 40 Angstroms.

As mentioned earlier herein, the carbon sorbent used in the storage and dispensing system of the invention may have any suitable size, shape and conformation appropriate to the end use application and the specific sorbate fluid species involved. The carbon sorbent material may for example be in the form of beads, granules, pellets, tablets, powders, particulates, extrudates, cloth or web form materials, honeycomb matrix monolith, composites (of the carbon sorbent with other components), or comminuted or crushed forms of the foregoing conformations.

Collectively, the storage and delivery system of the present invention may usefully consist of a standard gas cylinder, and a cylinder valve or other flow dispensing assembly (regulators, monitors, sensors, flow directing means, pressure controllers, mass flow controllers, piping, valving, instrumentation, automatic start and shut-off devices, etc.) coupled to the cylinder, with the cylinder holding the carbon sorbent material. The cylinder is subsequently filled, e.g., to 1 atmosphere pressure, with a sorbate fluid such as hydride gas.

Fluid flow from the storage and delivery system of the invention by pressure differential desorption may be readily carried out by utilizing a pressure differential between the pressure in the interior volume of the storage and delivery system and a lower pressure exterior to the sorbent-containing vessel.

For example, the sorbent-containing vessel may hold a reagent gas such as phosphine at a subatmospheric pressure, e.g., 600 Torr, for use in an ion implantation process, where the ion implant chamber for implanting the phosphorus constituent is maintained under vacuum conditions or alternatively at low pressure, e.g., below 100 Torr, below the pressure of the interior volume in the storage and dispensing vessel. As a result, phosphine gas will desorb from the carbon sorbent in the vessel and flow to the ion implant chamber, when gas flow communication is established between the ion implant chamber and the storage and dispensing vessel containing the sorbate phosphine gas. The storage and dispensing system thus effects flow of the phosphine gas through the connecting piping, valving and instrumentation, and is readily controllable at a desired flow rate. Utilizing a device such as a mass flow controller, a constant flow can be achieved as the sorbent vessel pressure decreases with continued dispensing operation.

Additionally, or alternatively, the fluid dispensing assembly of the storage and dispensing system of the invention may include means for heating the sorbent material, to thermally desorb sorbate fluid therefrom. Such heating means may include any suitable heat transfer or heat exchange devices, structures or apparatus, which are operatively associated with the sorbent material to effect heating thereof, for thermal desorption of the sorbate from the sorbent medium. Thus, the present invention contemplates heat- and/or pressure-mediated dispensing of sorbate fluid from the sorbent on which same is stored.

Referring now to the drawings, FIG. 1 is a graph of an adsorption isotherm for arsine, shown as a plot of the arsine loading, measured in grams of arsine per liter of sorbent material, as a function of the pressure, measured in Torr, for each of an illustrative carbon sorbent (curve A, data point symbol △) and for zeolite 5A molecular sieve (curve B, data point symbol □). The carbon sorbent material is a Kureha BAC-G-70R carbon material, having the following physical properties set out in Table I below.

TABLE I

| Bead Carbon Sorbent Material | |
|---|---|
| True Density | 1.9–2.1 g/ml |
| Bulk Density | 0.5–0.62 g/ml |
| Surface Area | 800–1300 m²/grams |
| CCl4 Activity | >=55% |
| Kindling Point | 400° C. |
| Autoignition Point (in air) | 400° C. |
| Ash Content | <=0.5% |
| Particle Size Availability | 0.4–0.7 mm |
| Particle Size of BAC-G-70R | 0.7 mm Avg.; >.84 mm (25%); <.59 mm (5%) |
| Moisture Content | <5% |

Concerning the moisture content of the above-tabulated material, it is preferred to reduce such moisture content to low levels on the order of 0.01% and below, by heating and evacuation, concurrently by such treatment reducing other undesirably adsorbed impurities.

Figure 2:
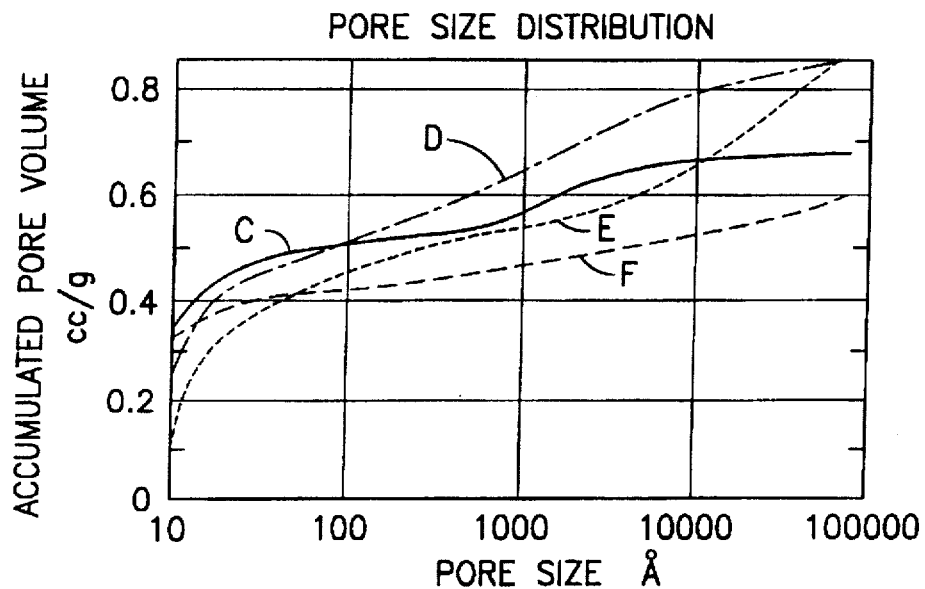
FIG. 2 is a plot of accumulated pore volume, in cubic centimeters per gram, as a function of pore size, for some illustrative activated carbon sorbents useful in the broad practice of the present invention.

FIG. 2 is a plot of accumulated pore volume, in cubic centimeters per gram, as a function of pore size, in Angstroms, for the bead carbon sorbent material of Table I (curve C) and for some additional illustrative commercially available activated carbon sorbents (curves D, E and F) useful in the broad practice of the present invention. As shown, the curve C bead carbon material has an accumulated pore volume of from about 0.3 to about 0.7 over the range of pore sizes from 10 to 10,000 Angstroms. The other carbon sorbent materials of curves D, E and F have a wider range of accumulated pore volume.

In general, it is desirable to utilize a carbon sorbent material having a substantial portion, preferably at least 50%, of its pores in the size range of from about 10 to 1000 Angstroms. More desirably, the carbon sorbent material has a major fraction, i.e. more than 50%, of its pore volume, comprised of pores with a diameter in the range of from about 10 Angstroms to 100 Angstroms, with preferably more than 80%, and most preferably substantially all of the pore volume of the carbon sorbent material, being in such range.

Preferred sorbent materials include carbon sorbents having an average pore diameter in the range of from about 10 to about 20 Angstroms, and a major fraction of the pore volume within such range, with preferably more than 80%, and most preferably substantially all of its pore volume being in such range.

Desirable carbon sorbents include materials having a pore volume (cumulative void volume) in the range of from about 0.2 to about 2.0 cubic centimeters of pore volume per gram of sorbent material.

High performance carbon sorbents useful in the broad practice of the present invention include those having a Sorbent Working Capacity, $C_w$, measured for arsine gas (as the reference fluid) at 40 Torr and at 650 Torr, of at least 100, preferably at least 150, more preferably at least 180, and most preferably at least 200, grams arsine per gram of sorbent material. The Percent Desorbable Sorbate desirably is on the order of at least 15%, preferably at least 25%, more preferably at least 50%, and most preferably at least 60%.

Bead activated carbon materials, having a highly uniform spherical shape, with a particle size in the range of from about 0.1 millimeter to 1 centimeter diameter, and more preferably from about 0.25 to about 2 millimeters diameter, are highly advantageous in the practice of the present invention. It will be appreciated, however, that the size, shape, porosity, and pore dimensional characteristics may all be widely and separately varied, as desirable to achieve a given loading density of the adsorbent for loading of sorbate on the sorbent medium at a predetermined level.

Preferred carbon sorbent materials in the fluid storage and dispensing system of the invention comprise carbon materials which have an arsine gas adsorption isotherm at 25° C., measured in grams of arsine adsorbed per liter of the sorbent, as a function of pressure in Torr, with the following adsorption loading characteristic:

| Pressure, Torr | Loading (grams of arsine per liter of sorbent) of at least: |
|---|---|
| 25 | 35 |
| 50 | 75 |
| 100 | 100 |
| 200 | 160 |
| 300 | 200 |
| 400 | 225 |
| 500 | 240 |
| 550 | 250 |
| 650 | ~300. |

Suitable carbon sorbent materials may for example have the following adsorption loading characteristic at 25° C. temperature:

| Pressure, Torr | Loading (grams of arsine per liter of sorbent): |
|---|---|
| 25 | 35–60 |
| 50 | 75–100 |
| 100 | 100–115 |
| 200 | 160–175 |
| 300 | 200–220 |
| 400 | 225–245 |
| 500 | 240–260 |
| 550 | 250–275 |
| 650 | 260–300. |

Highly preferred carbon sorbent materials useful in the broad practice of the invention include materials having an adsorption isotherm for arsine gas, at 25° C., measured as grams of arsine adsorbed per liter of the sorbent, as a function of pressure in Torr, with the adsorption isotherm characteristic of curve A in FIG. 1.

Nonetheless, it will be recognized that the pore size, pore volume, and surface area characteristics may be widely varied in the broad practice of the present invention, and that the skilled artisan may readily determine suitable sorbent characteristics for a given end use application of the storage and dispensing system of the present invention without undue experimentation using surface area and porosity determinations, e.g., with mercury porosimetry techniques, and affinity studies for the particular fluid sought to be stored on and dispensed from the particular candidate sorbent material.

Referring again to FIG. 1, an isotherm for a sorbent material and a specific sorbate gas is generally useful in predicting the quantity of sorbate removable at a given pressure. This is due to the reversibility of the adsorption/desorption process for the physisorbed fluid species. For example, for the bead carbon sorbent material of curve A, if the sorbent material on which the arsine fluid is sorbed, is desorbed from a pressure of 650 Torr to a pressure of 100 Torr, then the isotherm predicts that 140 grams of arsine per liter of sorbent material (275 grams–135 grams=140 grams) should be desorbed. The zeolite 5A molecular sieve, by contrast, when desorbed over a same pressure differential, exhibits desorption of only 87.5 grams of sorbate fluid (215 grams–127.5 grams=87.5 grams).

Thus, the amount of sorbate recoverable from the carbon sorbent in a storage and dispensing system of the invention, when operated by pressure desorption over the specified pressure range of 650 Torr to 100 Torr, is 60% higher than the zeolite 5A material of the prior art storage and dispensing system. Accordingly, the performance of the carbon sorbent material of curve A in FIG. 1, as representative of the performance of the carbon sorbent media in the broad practice of the present invention, evidences a surprising and unexpected improvement in the ability to desorb the sorbate fluid from the sorbent material for dispensing.

FIG. 3 is a schematic representation of a storage and delivery system according to one embodiment of the invention.

In the schematic storage and delivery system shown in FIG. 3, a gas storage cylinder 10 is provided which may be filled with a bed 17 of suitable carbonaceous physical adsorbent material, e.g., a bead activated carbon physical adsorbent medium of a type as more fully described hereinabove. The gas cylinder 10 contains the bed 17 of carbon sorbent material, with the sorbent material having a physically adsorbed gas component(s), such as arsine or phosphine, adsorbed on its surfaces (including pores as well as exterior surface of the sorbent media).

The cylinder 10 is connected to a manifold 12, having disposed therein a cylinder valve 14 for controllably releasing gas from cylinder 10, upstream of a gas cylinder isolation valve 16, which may be selectively actuated to close cylinder 10 to communication with the manifold 12.

The manifold has a branch fitting 18 therein, by means of which the manifold 12 is coupled in gas flow communication with a branch purge line 20 having inert gas purge isolation valve 22 therein, whereby the manifold may be purged with inert gas, prior to active operation delivery of gas from cylinder 10.

Downstream from the fitting 18, the manifold contains two successive gas filters 28 and 30, intermediate of which is disposed a pressure transducer 32 which may, for example, have a pressure operating range of from about 0 to about 25 psia.

The manifold 12 is connected downstream of gas filter 30 with a branch fitting 34 to which is coupled a bypass conduit 36 having bypass isolation valve 38 therein. The manifold 12 downstream of fitting 34 has a gas flow on-off valve 40 therein, downstream of which is disposed a mass flow controller 42 for controllably adjusting the flow rate of the hydride or halide gas dispensed through manifold 12. At its terminus downstream of mass flow controller 42, the manifold 12 is connected by coupling fitting 44 to dispensing line 46 having flow control valve 48 therein, and also being coupled in gas flow communication with bypass line 36 via coupling fitting 50. The discharge line 46 is as shown joined to an ion source generating means, schematically shown as element 52. The other end 54 of discharge line 46 may be suitably coupled in gas flow communication with another gas dispensing means, as desirable or necessary in a given end use application of the FIG. 3 storage and delivery system apparatus.

Shown as an optional feature of the storage and dispensing vessel 10 in the FIG. 3 embodiment is a heat exchange passage 11 which extends vertically upwardly through the bed 17 of sorbent material. The heat exchange passage is joined at its respective lower and upper ends to heat exchange fluid feed inlet line 13 and heat exchange fluid effluent discharge line 15. The heat exchange fluid feed inlet line 13 may in turn be joined to a suitable source of heat exchange fluid (not shown) which may be operatively associated with a burner, resistance heater, or other heating means serving to selectively heat the bed 17 of sorbent material when it is desired to dispense fluid from the vessel 10. Thermal desorption thus may be effected by passage of a suitable heat exchange fluid through the feed inlet line 13, the heat exchange passage 11, and the fluid effluent discharge line 15, for recirculation (e.g., by pump and reservoir means, not shown) through the heat exchange circuit. Such heating means thereby function to heat the sorbent medium in the bed 17 to sufficient elevated temperature for thermally-assisted desorption to take place.

By the arrangement schematically shown in FIG. 3, thermally assisted desorption and dispensing of the sorbate fluid may be carried out alternative to, or in combination with, pressure differential-mediated dispensing of the sorbate fluid, with the choice of the specific desorption modality being readily selected and/or determinable without undue experimentation by those skilled in the art.

In the manufacture of the storage and dispensing system of the invention, the storage and dispensing vessel is cleaned, if required, to ensure the absence of any contaminants or species therein, including out-gassable species in the walls of the vessel, which may adversely impact the storage and dispensing operation subsequently carried out with the vessel. For this purpose, it may be desirable to bake out, solvent degrease, or otherwise subject the vessel and its interior surfaces to cleaning, removal or treatment steps, to provide an appropriately clean container for the subsequently installed sorbent material.

The carbon sorbent material then is loaded into the interior volume of the storage and dispensing vessel, and the vessel is final assembled and sealed. The sorbent material may be cleaned or processed prior to its introduction to the vessel, so that the sorptive capacity of the sorbent medium is maximized. Additionally, or alternatively, the sorbent medium may be cleaned or processed in situ, to ensure maximum sorptive capacity, e.g., by bake-out of the vessel containing the sorbent, at sufficient elevated temperature and for sufficient time to desorb and clean the sorbent material of extraneous sorbate species. For example, the vessel may be evacuated (degassed) for an extended period of time, e.g., 48 hours, at a suitable elevated temperature, e.g., 200°–400° C., using an appropriate vacuum pump or other evacuation means. After evacuation, the vessel is allowed to cool to room temperature over a suitable period of time, e.g., ~6–12 hours.

After the evacuation/degas procedure, the evacuated carbon sorbent container is connected to a sorbate fluid fill manifold. It will be recognized that the sorption of fluid species may involve significant exotherm due to heat of adsorption effects, and therefore it is desirable to maintain the vessel and carbon sorbent material at suitable temperature so that the sorbate fluid is not desorbed by such heat effects after its initial take-up by the sorbent material.

In order to maintain an approximate isothermal condition, the cylinder may for example be immersed in a thermal ballast liquid, such as for example an aqueous ethylene glycol mixture maintained at a constant temperature of 25° C.

The sorbate fluid fill manifold may be evacuated prior to sorbate fluid dispensing to appropriately low pressure, e.g., to less than $10^{-3}$ Torr, to remove non-condensable gases that may be present in the flow passages of the fill manifold. After such evacuation, the carbon sorbent-containing vessel may be filled with the sorbate fluid at a suitable rate until the desired pressure level is reached. For purposes of efficiency, it may be desirable to monitor the pressure of the vessel during the fill operation with a suitable pressure monitor or other (e.g., transducer-based) sensing means.

During the filling process, the temperature of the vessel and the thermal ballast tank may be independently monitored, along with the sorbate fluid temperature, for process control purposes. Pressure is monitored to determine the endpoint of the fill process.

It may be desirable to fill the vessel with the sorbate fluid in stages, and to allow equilibration of the system so that the temperature effects are at least partially dissipated to the ambient environment or to a heat transfer medium such as the thermal ballast liquid described hereinabove.

Alternatively, it may be suitable to fill the vessel to a specified pressure, and then allow the vessel to cool to a final temperature and pressure condition of the sorbent bed and associated vessel.

Thus, dose filling or continuous filling of the sorbate fluid may be carried out, to introduce the sorbate fluid into the vessel for sorptive take-up by the sorbent material therein. Following the fill sequence, the vessel, after its disengagement from the fill manifold, may be shipped, stored, or arranged for subsequent dispensing use by attachment to piping, coupling, and dispensing circuitry at the dispensing site.

Figure 4:
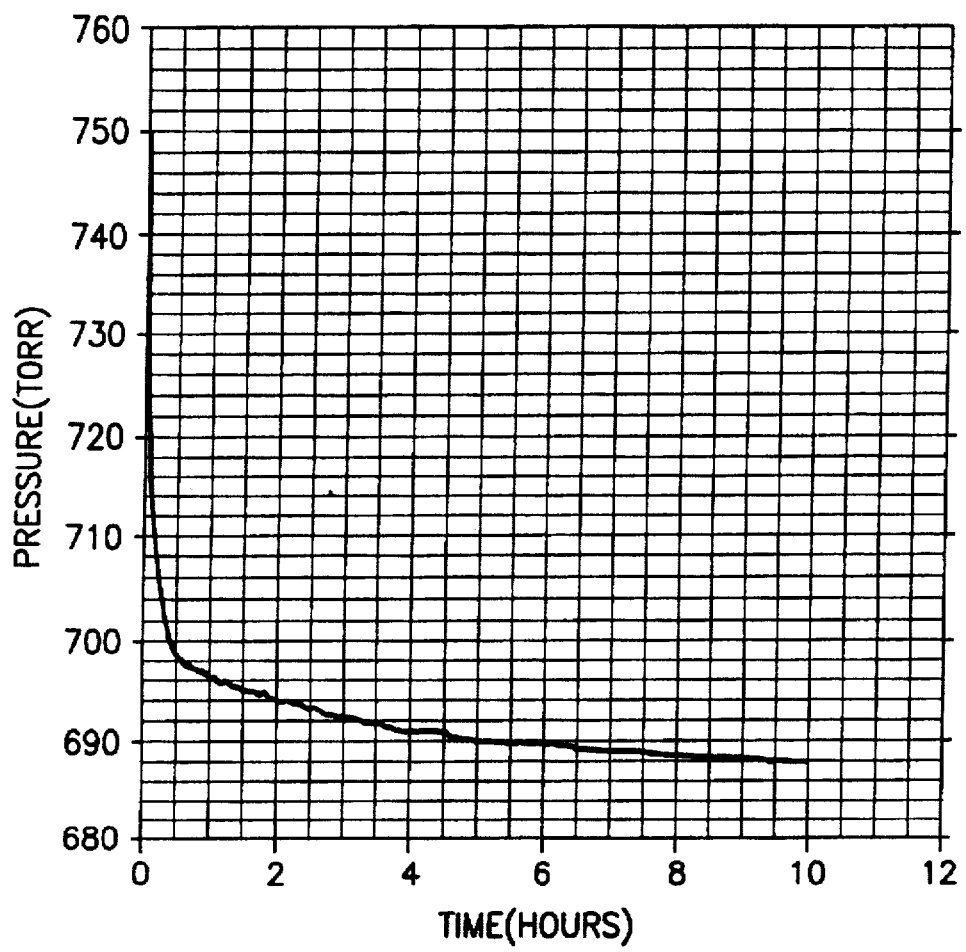
FIG. 4 is a plot of cylinder pressure, in Torr, as a function of time, in hours, graphically showing the pressure decay of arsine gas on carbon sorbent in a storage and dispensing system according to the invention, after the termination of the arsine filling operation.

FIG. 4 is a plot of cylinder pressure, in Torr, as a function of time, in hours, graphically showing the pressure decay of arsine gas on carbon sorbent in a storage and dispensing system according to the invention, after the termination of the arsine filling operation. As shown, the pressure in the sorbent-containing vessel decays from an initial pressure level of 750 Torr (at time zero) to 688 Torr after 10 hours.

The plot of FIG. 4 shows the non-equilibrium condition existing in the vessel at the conclusion of the arsine fill operation. At such point, the heat of adsorption effects produce a relatively high pressure (in comparison to the final equilibrium pressure level after cooling). The subsequent pressure decay is due to the cooling of the sorbent bed and vessel after the termination of the fill operation. Accordingly, it is appropriate to assess the pressure level in the storage and dispensing vessel following the fill step, after the heat of adsorption effects have been dissipated.

Figure 5:
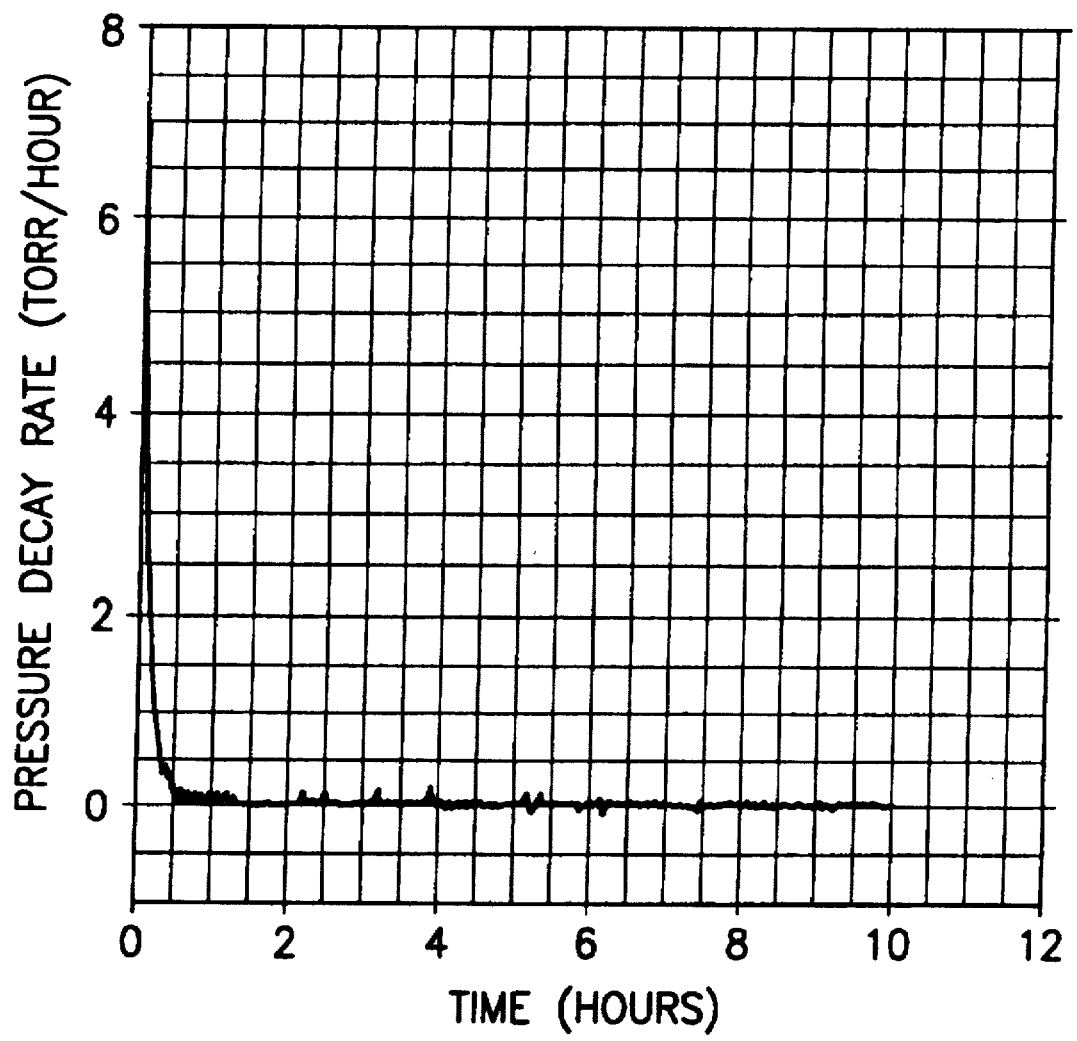
FIG. 5 is a plot of pressure decay rate, in Torr/hour, as a function of time, in hours, for an arsine storage and delivery system according to the present invention.

FIG. 5 is a plot of pressure decay rate, in Torr/hour, as a function of time, in hours, for the arsine storage and delivery system according to the present invention, whose post-fill pressure characteristics are shown in FIG. 4. FIG. 5 shows the decay rate curve, which is determined as the derivative of the curve shown in FIG. 4. The rate curve of FIG. 5 shows that pressure fluctuations in the storage and dispensing vessel subside to a stable level as the decay rate approaches zero after about 2 hours.

Further, the plots of FIGS. 4 and 5 show that the pressure in the storage and dispensing vessel after sorbate gas fill is decreasing, not increasing, from which it can be inferred that the arsine sorbate is not decomposing in situ in the vessel. This is significant, in that sorbent materials may contain contaminants or trace species which can serve to mediate or promote the decomposition of sorbate gases such as arsine.

In order to assure the absence of undue decomposition of arsine or other sorbate gas species, it is desired that the carbon sorbent medium in the practice of the present invention be devoid of trace components, such as those selected from the group consisting of water, metals, and oxidic transition metal species (e.g., oxides, sulfites and/or nitrates), sufficient in concentration to decompose the sorbate fluid in said storage and dispensing vessel.

In the storage and dispensing system of the invention, the concentration on the carbon sorbent material (based on the weight of the carbon sorbent material) of trace components selected from the group consisting of water and oxidic transition metal species, desirably is insufficient to decompose more than 5%, and preferably more than 1% by weight of the sorbate fluid after 1 year at 25° C. and said interior pressure. This criterion ensures that sorbate fluids such as hydride gases, e.g., arsine, phosphine, etc., which are otherwise susceptible to decomposition in the presence of water, metals, and oxidic transition metal species (e.g., oxides, sulfites and/or nitrates), are maintained free of substantial exposure to such species, so that significant levels of decomposition of the sorbate gas, and resulting pressure buildup problems, are avoided.

Preferably, the concentration of trace components selected from the group consisting of water, metals, and oxidic transition metal species, based on the weight of the carbon sorbent material, is insufficient to cause decomposition of the sorbate fluid resulting in more than a 25% rise, and preferably more than a 10% rise, in interior pressure after 1 week at 25° C. in the storage and dispensing vessel.

Carbon sorbent materials advantageously employed in the practice of the present invention include carbon materials which desirably contain less than 350, preferably less than 100, more preferably less than 10, and most preferably less than 1, part(s)-per-million by weight of trace components selected from the group consisting of water and oxidic transition metal species, based on the weight of the carbon sorbent medium.

Figure 6:
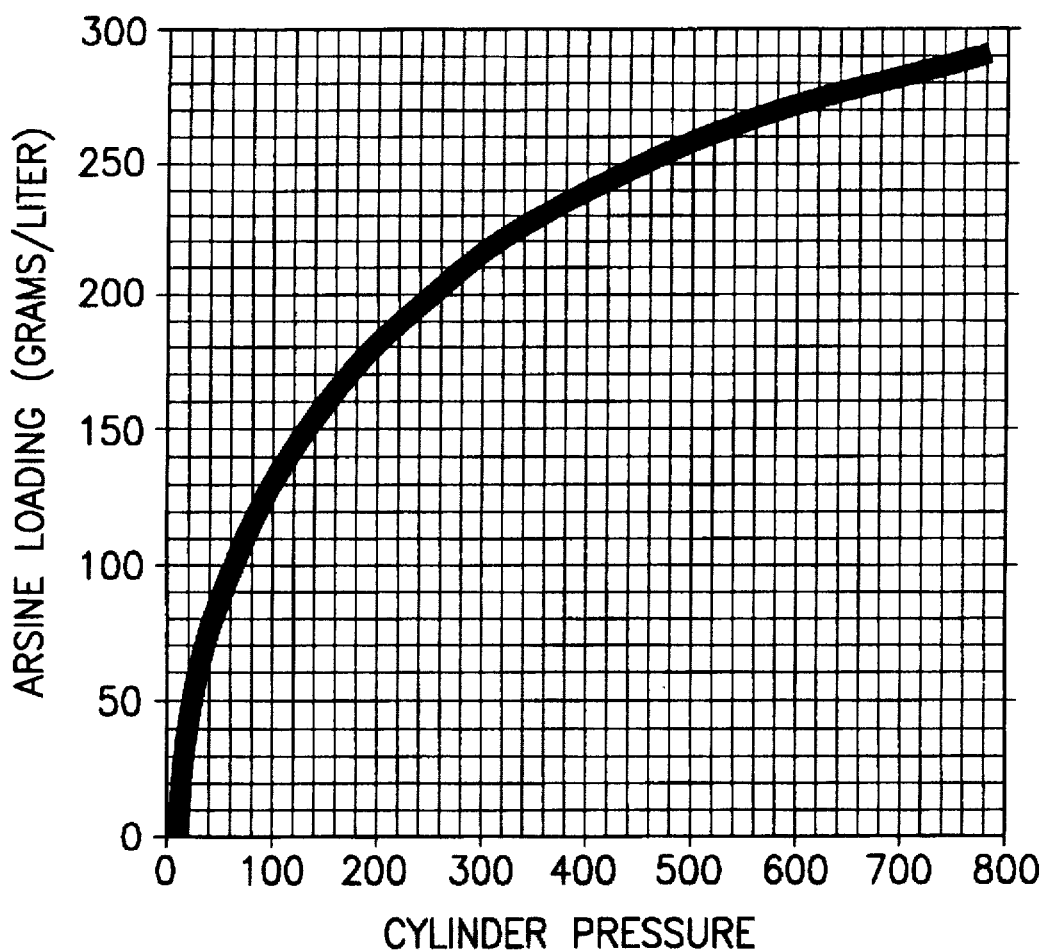
FIG. 6 is a plot of an arsine adsorption isotherm, plotted as arsine loading, in grams/liter, as a function of storage and dispensing vessel pressure, in Torr, on a bead carbon sorbent material.

FIG. 6 is a plot of an arsine adsorption isotherm, plotted as arsine loading, in grams/liter, as a function of storage and dispensing vessel pressure, in Torr, on a bead carbon sorbent material. From this adsorption isotherm, which has substantially the same shape as the arsine adsorption isotherm of FIG. 1 (curve A), the working Sorbent Working Capacity, $C_w$, measured for arsine gas at 40 Torr and at 650 Torr, measured as $C_w$=(Weight of arsine gas, in grams, on one liter of sorbent at 650 Torr and 25° C.) −(Weight of arsine gas, in grams, on one liter of sorbent at 50 Torr and 25° C.)

is 278−70=208 grams arsine per liter of sorbent.

As discussed hereinabove, preferred carbon sorbent media in the practice of the present invention include sorbents having arsine (used as the reference measuring gas sorbate species) adsorption isotherms with a shape corresponding to the shape of the adsorption isotherm characteristic of curve A in FIG. 1, which also is the adsorption isotherm shape shown in FIG. 6.

Figure 7:
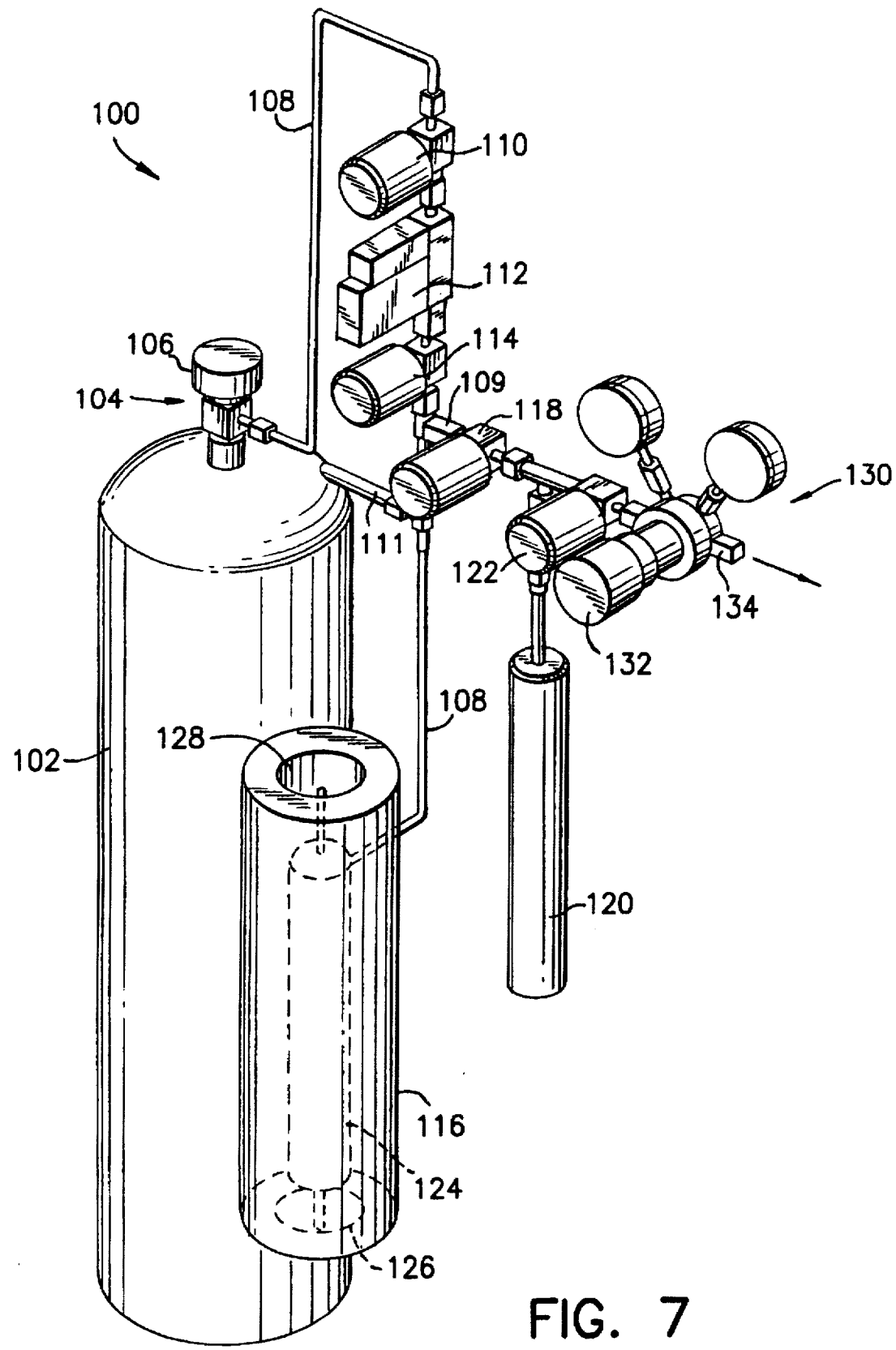
FIG. 7 is a schematic perspective view of a cryopumping storage and delivery system apparatus according to a further embodiment of the invention.

FIG. 7 is a schematic perspective view of a cryopumping storage and delivery system apparatus according to a further embodiment of the invention.

Although the fluid storage and dispensing system of the present invention has been described hereinabove with reference to low pressure dispensing applications such as ion implantation, where the locus of use of the desorbed sorbate gas is at vacuum or very low pressure levels, it will be appreciated that the utility of the invention is not thus limited, but also encompasses applications in which the storage and dispensing vessel must furnish sorbate gas to a downstream use point at higher than atmospheric pressure.

For applications in which it is desired to provide gases for use at a higher-than-discharge pressure from the sorbent-containing vessel of the storage and delivery system, various pressure building circuits, pressurizing equipment, or other means or methods may advantageously be employed.

For example, venturi pumps may be provided to raise the pressure of the supplied gas to a selected pressure level above that at the cylinder head (of the cylinder containing the sorbent binding the gas being dispensed). Although such venturi pumping arrangements yield the dispensed gas at the selected higher pressure level, such arrangements nonetheless entail dilution of the gas being dispensed with a carrier gas, since the carrier gas is entrained with the dispensed gas from the cylinder.

Such carrier gas dilution effects may be satisfactory in some applications, however in some uses, these dilution effects may represent a significant constraint on the overall process system, e.g., in instances where neat gas of high purity is desired to be supplied from the storage and delivery system. Mechanical pumps may be used in place of venturi pumping means, but mechanical pumps entail the disadvantage of a significant number of moving parts, which can cause problems associated with the formation of particulates in the pump and/or entrainment of lubricants in the gas stream. Again, these may be tolerable concomitant effects in some applications, but in other uses, the supplied gas must be maintained at high purity and free of particulates or other extraneous material.

In instances where the gas supplied by the storage and delivery system must be furnished at high pressure in a high purity, neat condition, the provision of a cryopumping assembly in the storage and delivery system may be advantageous.

FIG. 7 is a schematic perspective view of such a cryopumping storage and delivery system apparatus 100, according to a further embodiment of the invention.

In the cryopumping system, the main cylinder 102 contains a suitable carbon sorbent material (not shown), having loaded thereon a suitable sorbate gas species to be subsequently dispensed. Cylinder 102 is equipped with a valve head assembly 104 including main cylinder valve 106, which is in the "off" position at the start of the dispensing process.

The valve head 104 is coupled to conduit 108 containing isolation valve 110, mass flow controller 112, isolation valve 114, and cryopump 116. Conduit 108 is in turn coupled to conduit 109 containing isolation valves 118 and 122 and product dispensing regulator assembly 130 having discharge port 134 coupleable to a downstream process system. Joined to the conduit 109 is a medium pressure storage vessel 120.

The cryopump 116 coupled to conduit 108 is provided with a liquid nitrogen (or other suitable cryogenic liquid or fluid) inlet 128 and a liquid nitrogen outlet 126, with a liquid cryogen flow path being provided intermediate the inlet 128 and the outlet 126 which is circumscribed by heating elements 124 as shown. The liquid cryogen inlet and outlet of the cryopump may be suitably joined to a source of liquid cryogen, as for example a cryogenic air separation installation or a cryogenic cylinder source of liquid nitrogen or other coolant. The cryopump thereby forms a cryotrap apparatus. The outlet of the cryopump thus is provided with an isolation valve 122, and the medium pressure cylinder 120 is isolatable by means of the isolation valve 122.

A pressure transducer 111 is provided in conduit 108 and is coupled in pressure monitoring relationship to cylinder 102 for monitoring of pressure in the cylinder and responsively adjusting the isolation valve 118.

The operation of the storage and delivery system shown schematically in FIG. 7 is illustrated below with reference to silane as the gas sorbed on the carbon sorbent in cylinder 102 and to be delivered at suitable elevated pressure, and nitrogen as the cryogen to be employed as the working fluid in the cryopump 116. Silane has a boiling point of −111.5 degrees Centigrade and a melting point of 185 degrees Centigrade, and nitrogen has a boiling point of −195.8 degrees Centigrade.

Silane has been selected for illustration purposes since it is relatively difficult to deliver at suitably elevated pressure (in relation to other hydridic gases such as arsine which have higher boiling and freezing points, and thus may be more easily cryopumped with less cryogenic cooling being required).

If at the outset valves 110, 114, and 106 are open, with valves 118 and 122 being closed and under vacuum, and the temperature in the cryogenic pump is lowered to liquid nitrogen temperatures, silane will condense and freeze in the cryopump, even if relatively low internal pressures exist in the supply cylinder 102.

The mass flow controller 112 allows for accurate determination of the quantity of gas being transferred to the cryopump 116. Such accurate determination is important because overpressurization of the cryopump is desirably avoided. Under such operating conditions, silane will be above its critical temperature so that the ultimate pressure in the cryopump can potentially become very high.

After the correct amount of gas has been transferred to the cryopump 116, the valves 110 and 114 are closed. The condensed silane then is warmed to near ambient temperatures. The heating is carried out by the heating means 124, which in the embodiment shown comprise band heaters but could be any suitable heating means appropriate for such service. The silane gas does not thereby have to be heated to high temperatures, and the stability and purity of the product gas to be dispensed is thereby enhanced, since heating may result in the occurrence of degradation of the silane gas with consequent adverse effect on its purity and further stability.

The pressure of the silane gas after the warm-up in the cryopump may become significantly elevated, and effectively the gas thereby has become compressed, in a high purity state, and without exposure to a mechanical pump with many moving parts, the use of which may otherwise result in contamination of the product gas.

The inventory of gases in the overall system may be quite low at this point, with most of the silane residing in the sorbent vessel, cylinder 102, at low pressure.

Opening valve 118 will then allow gas to flow into the medium pressure cylinder 120; if valve 122 is open, then product silane gas can flow to the downstream process through discharge port 134, as monitored by the monitoring means (e.g., flow pressure) associated with the regulator assembly 130. The regulator assembly 130 has associated pressure transducer 132 which may be operatively coupled in the overall system with the other valves and cryopump components so that the product gas is delivered at a selected pressure and volumetric flow rate.

Correspondingly, the various valves, mass flow controller, cryopump, transducers and regulator may be operatively interconnected in any suitable manner, e.g., with cycle timer, and process safety systems, to carry out the demand-based delivery of silane or other sorbate gases, in a readily controllable and reproducible manner.

Accordingly, the operation of the system schematically shown in FIG. 7 desirably is timed to avoid disruption to or interference with downstream process flows. Signals from the mass flow controller and pressure transducers in the cryopump and medium pressure tanks can be used in an automated process system. The cryopump can be cycled to move gases from the storage and delivery system to the medium pressure cylinder 120 to maintain a constant pressure at the outlet of the regulator.

Figure 8:
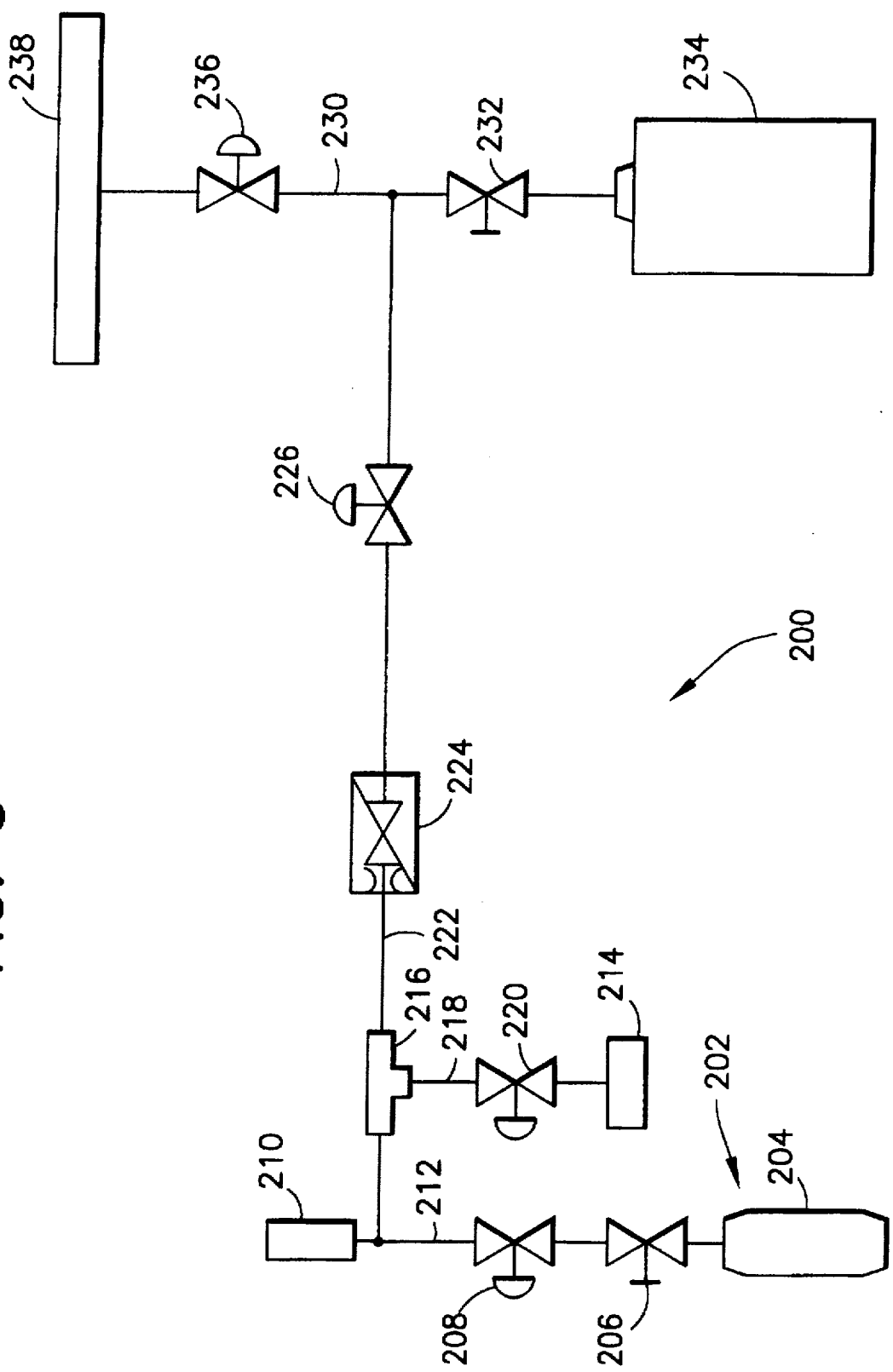
FIG. 8 is a schematic representation of a delivery measurement apparatus for evaluating the performance of a storage and dispensing system according to the invention.

FIG. 8 is a schematic representation of a delivery measurement apparatus 200 for evaluating the performance of a storage and dispensing system 202 according to the invention. The storage and dispensing system 202 comprises a storage and dispensing vessel 204 containing a carbon sorbent material (not shown) and a fluid dispensing assembly comprising discharge flow line 212 having cylinder valve 206, gas cylinder isolation valve 208, and (0–1000 Torr) pressure transducer 210 disposed therein and arranged as shown.

Line 212 is connected by suitable connector means to connection line 222 having T-connector 216 therein joining inert gas purge line 218 containing inert gas purge isolation valve 220 connected to inert purge gas source 214. Line 212 also contains mass flow controller 224 therein for maintaining constant pressure and flow rate in the connection line 222. A gas on/off valve 226 in line 212 serves to selectively flow gas through line 222 to line 230 joined by connector means to line 222.

Line 230 is connected at one end to a vacuum system 238 and to a liquid nitrogen chilled receiver vessel 234 at its opposite end. Intermediate the respective ends, are disposed valves 236 and 232 as illustrated.

The delivery measurement apparatus shown in FIG. 8 permits the flow of sorbate fluid out of the storage and dispensing vessel 204 at a controlled rate by means of the mass flow controller 224. The desorbed and dispensed gas is then collected in liquid nitrogen chilled receiver vessel 234, after flow though lines 212, 222, and 230 to such vessel, by appropriate closed/opened settings of the appropriate valves in the various lines of the overall system.

At liquid nitrogen temperatures, the vapor pressure of the sorbate gas is essentially zero Torr, which permits desorption of the sorbate fluid from the carbon sorbent medium even at low storage and dispensing vessel pressures. The experiment is typically run until the test vessel 204 is at a pressure on the order of ~50 Torr. At such point, there is typically insufficient pressure differential to sustain a suitable flow rate (~5 sccm) through the mass flow controller.

The quantities of the sorbate fluid flowed from vessel 204 to the chilled receiver 234 then is determined by independently totalizing the mass flow (using mass flow controller 224) and by weighing the storage and dispensing vessel 204 before and after desorption has been carried out.

In an illustrative experiment using the delivery measurement system of FIG. 8, arsine gas is dispensed from a storage and dispensing vessel containing as the carbon sorbent a carbon material having the characteristics of Table 1 herein. The results of this experiment are shown in Table 2 below.

TABLE 2

Desorption Capacities of Arsine from Bead Activated Carbon

| | |
|---|---|
| Desorption Capacity by Mass Flow Controller Measurement | 132 grams of Arsine per Liter of Adsorbent |
| Desorption Capacity by Weight Difference Determination | 166 grams of Arsine per Liter of Adsorbent |
| Post-Desorption Adsorption Capacity | 167 grams of Arsine per Liter of Adsorbent |

The foregoing adsorption/desorption capacity data reflect an approximately two-fold improvement over a corresponding storage and delivery system utilizing a typical molecular sieve sorbent material such as 5A molecular sieve, and further evidence the substantial and unexpected character of the present invention relative to the prior art.

Figure 9:
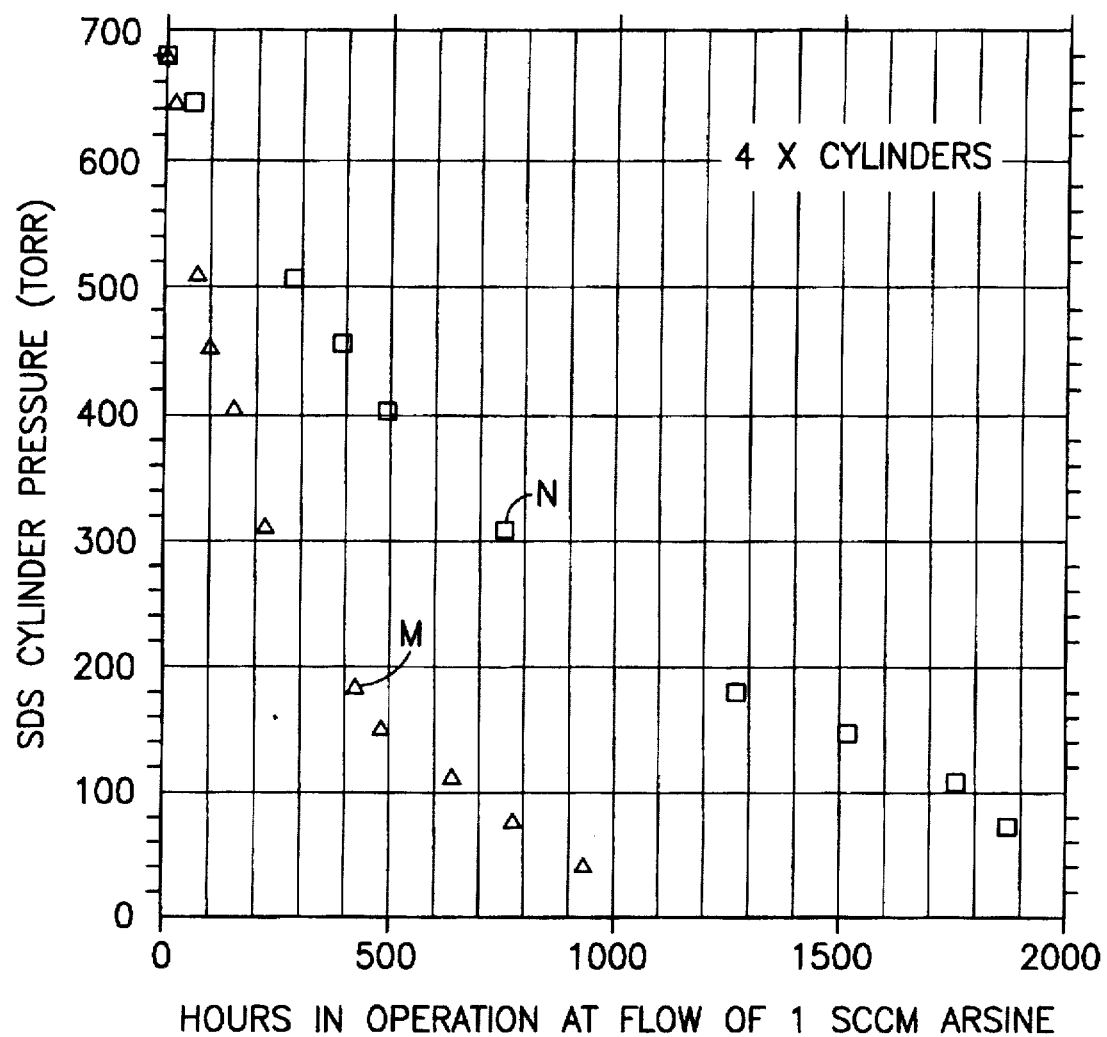
FIG. 9 is a graph of performance of a storage and delivery system comprising 5A molecular sieve as the sorbent material (curve M) and a storage and dispensing system comprising bead activated carbon as the sorbent material (curve N), showing pressure in the storage and dispensing vessel, in Torr, as a function of hours in operation at a flow rate of 1 standard cubic centimeter arsine per minute.

FIG. 9 is a graph of performance of a storage and delivery system comprising 5A molecular sieve as the sorbent material (curve M, data point symbol Δ) and a storage and dispensing system comprising bead activated carbon as the sorbent material (curve N, data point symbol □), showing pressure in the storage and dispensing vessel, in Torr, as a function of hours in operation at a flow rate of 1 standard cubic centimeter arsine per minute. These curves show that at a constant flow rate of 1 sccm dispensing of arsine, a storage and dispensing system representative of the present invention (curve N) provides a two-fold improvement in dispensing service life. Such performance data further evidences the surprising and unexpected behavior of the storage and dispensing system of the present invention relative to the storage and delivery system of the prior art (curve M).

The storage and delivery system apparatus and method of the invention provide a significantly safer alternative to the current use of high pressure gas cylinders for the storage and dispensing of sorbable gases. The invention provides the capability to transport, store and deliver sorbable fluids from a cylinder or other vessel at zero psig. The invention is based on the discovery that sorbable gases can be physically adsorbed by the pores, surfaces and microcavities of carbon sorbent materials, thereby significantly reducing the pressure of gas for storage and dispensing purposes.

With only low level heating of the sorbent material in the practice of the present invention, by so-called thermally assisted delivery, it is possible to augment the delivery rate of the desorbing gas, so that flow rates of up to 500 sccm and higher are readily achievable. Nonetheless, high rates of gas delivery are achieved in the broad practice of the present invention with adiabatic operation (no supplemental input of heat or thermal energy to the sorbate-laden sorbent medium), solely by the pressure differential existing between the sorbent vessel and the reduced pressure of the external dispensing locus, e.g., in a semiconductor or other industrial or manufacturing process facility, such as an ion implantation chamber, molecular beam epitaxy unit, or chemical vapor deposition reactor.

The apparatus of the present invention may be readily provided in a unitary apparatus form, as for example by disposing one or more storage and dispensing systems of the invention in a gas cabinet. In such gas cabinet arrangement involving a multiplicity of sorbent vessels, each of the vessels may be manifolded together for selective delivery of sorbate gas from one or more of such vessels. The cabinet may further include therein independent thermocouples, or other temperature sensing/monitoring equipment and components, for preventing overheating of the vessels and/or other internal components of the gas cabinet, in use thereof.

Such gas source cabinet may additionally include a fusible link heater element for selective augmentive heating of the vessels and sorbent therein; a sprinkler system; an exhaust heat sensor; a toxic gas monitor which functions to shut down the apparatus when toxic gas is sensed; a scrubber or bulk sorption device; and redundant pressure and temperature control means. With such a storage and delivery system apparatus, delivery rates of gas of 500 sccm at 15 psig are readily attainable.

In the preferred practice of the invention, the solid-phase carbon physical sorbent medium is devoid of trace components selected from the group consisting of water, metals, and oxidic transition metal species in a concentration which is insufficient to decompose the sorbate fluid in the storage and dispensing vessel. In this respect, it is to be noted that the significant presence in the sorbent material of any water, metals, or transition metal oxides tends to promote undesirably high levels of decomposition of the sorbate gas.

The solid-phase carbon physical sorbent medium in the preferred practice of the invention therefore contains less than 350 parts-per-million by weight of trace components selected from the group consisting of water and oxidic transition metal species, based on the weight of the physical sorbent medium, more preferably less than 100 parts-per-million by weight, still more preferably less than 10 parts-per-million, and most preferably no more than 1 part-per-million by weight of trace components selected from the group consisting of water and oxidic transition metal species, based on the weight of the carbon physical sorbent medium.

Correspondingly, the solid-phase carbon physical sorbent medium concentration of trace components selected from the group consisting of water and oxidic transition metal species (e.g., oxides, sulfites and nitrates), based on the weight of the physical sorbent medium, preferably is insufficient to decompose more than 5% by weight of the sorbate gas after 1 year at 25° C. and interior pressure conditions.

The features and advantages of the invention are more fully shown by the following non-limiting examples.

EXAMPLE I 74.7 grams (130 ml) of Kureha carbon was loaded into a clean 150 ml Hook stainless steel sample cylinder. The cylinder was fitted with a Nupro DS series diaphragm valve. The valve inlet port was modified so that a 30 micron Mott Metallurgical sintered metal polymer filter could be installed. The polymer filter served to contain the carbon particles inside the sample cylinder.

The cylinder was then evacuated (degassed) for 48 hours at a temperature of 300° C. The vacuum pump (Alcatel Molecular Drag Pump) used for degassing had an ultimate pressure of $1 \times 10^{-6}$ Torr. After the degassing period, the cylinder was allowed to cool, at room temperature, for ~6 hours.

The general properties of the Kureha carbon used are shown in Table 1 hereinabove.

The results of the degas procedure are shown in the Table 3 below:

TABLE 3

| Carbon Sorbent Degassing Characteristics | |
|---|---|
| Cylinder Tare Weight | 1195.4 Grams |
| Cylinder Weight + Carbon | 1270.1 Grams |
| Cylinder Weight + Carbon after Degas | 1268.1 Grams |
| Mass of Volatiles Removed by Degas | 2.0 Grams |
| Carbon Weight Wet | 74.7 Grams |
| Carbon Weight Dry | 72.7 Grams |
| Carbon Volume Wet | 130 ml |

EXAMPLE II

After the degas procedure of Example I, the evacuated carbon sample cylinder was connected to an arsine filling portion of an arsine fill manifold. In order to maintain an approximate isothermal condition, the cylinder was immersed into a dewar flask containing an ethylene glycol mixture held constant at 25° C. The fluid was circulated through the dewar flask using a Neslab RTE-100 recirculating constant temperature bath.

The entire manifold was then evacuated to less than $10^{-3}$ Torr to remove non-condensable gases. After evacuation, the carbon sample was filled with arsine at a rate of 25 sccm until the pressure of 760 Torr was attained. The pressure was monitored using a MKS 0-1000 Torr Baratron pressure transducer. During the filling process, the dewar flask temperature, the carbon cylinder pressure, and the ambient hood temperature (of the hood environment in which the fill took place) were monitored and logged using a Fluke electronic data logger.

A fill rate of 25 sccm was chosen in order to speed up the time it took to measure the adsorption capacity. However it was not possible to attain a true isotherm due to heat of adsorption effects. Even though the cylinder was immersed in a constant temperature fluid, the rate of heat exchange between the fluid and the adsorbent was not sufficiently rapid, which resulted in an artificially high pressure during the fill process. This is shown in FIG. 4 which evidences a non-equilibrium condition subsequent to filling.

This pressure decay was attributed to the cooling of the adsorption bed after termination of arsine flow. The heat evolved in the bed during the filling process was due to the heat of adsorption. Typically, a true isotherm is obtained by allowing the adsorption process to reach equilibrium before attaining a pressure data point. FIG. 5 shows the derivative of the curve from FIG. 4 which yields the pressure decay rate. The rate curve shows that pressure fluctuations subside to a stable level as the decay rate approaches zero in about 2 hours. Critically important, the pressure is not increasing, evidencing that the arsine is not decomposing.

An approximate isotherm was constructed and is shown in FIG. 4 hereof.

The adsorption capacity was quantified by integrating the mass flow rate of arsine for the duration of the experiment. The endpoint of the adsorption measurement is taken as 760 Torr or a pressure of 1 atmosphere. The adsorption capacity was also verified by mass, by taking the difference between the tare weight of the unfilled cylinder and the full cylinder at an arsine loading of 760 Torr. The results for the adsorption capacity measurements are shown in Table 4.

TABLE 4

| Adsorption Capacity Results | |
|---|---|
| Tare Weight of Empty Adsorption Cylinder | 1268.1 Grams |
| Weight of Cylinder after Filling with Arsine to 760 Torr | 1307.3 Grams |
| Grams Arsine Adsorbed Per Liter of Carbon By Weight | 301.5 Grams |
| Grams Arsine Per Liter By Totalizing Mass Flow | 290.63 Grams |

The prior art arsine storage and delivery system technology based on the adsorption of arsine on zeolite molecular sieve sorbent, has been demonstrated to have a hydrogen production rate of about 5 Torr per day. The present invention utilizes carbon sorbent materials which are distinguishable compositionally and functionally from the zeolite molecular sieve materials, and which have been shown to possess a high degree of stability and freedom from decomposition effects of the sorbate species.

Accordingly, consistent with the improved working capacity, desorption, and other functional characteristics of the carbon sorbent in the storage and dispensing system of the invention, it is evident that the system of the invention achieves a marked advance in the art over zeolite-based storage and dispensing systems, as well as the prior art practice of dispensing gas materials from high pressure cylinders.

The present invention has utility in the manufacture of semiconductor materials and devices, and in other gas-consuming process operations, where it provides a reliable "on demand" source of gas, e.g., hydride gases, halide gases, gaseous organometallic Group V compounds, etc., including, for example, silane, diborane, germane, fluorine, ammonia, phosphine, arsine, stibine, hydrogen sulfide, hydrogen selenide, hydrogen telluride, boron trifluoride, boron trifluoride, tungsten hexafluoride, chlorine, hydrogen chloride, hydrogen bromide, hydrogen iodide, and hydrogen fluoride.

By providing an economical and reliable source of such gases, in which the gas is safely held at relatively low pressure in the adsorbed state on a carbon sorbent medium, and subsequently is easily dispensed to the point of use of the gas, the present invention avoids the hazards and gas handling problems associated with the use of conventional high pressure gas cylinders.

What is claimed is:

1. A process for supplying a fluid reagent, such process comprising:

providing a storage and dispensing vessel containing a carbon sorbent material having a physically sorptive affinity for said fluid reagent;

physically sorptively loading the fluid reagent on the carbon sorbent material, to yield a sorbate fluid-loaded carbon sorbent material;

desorbing sorbate fluid from the sorbate fluid-loaded carbon sorbent material, by reduced pressure (pressure differential) desorption and/or heating of the sorbent material; and dispensing the desorbed fluid from the storage and dispensing vessel in a controlled manner such that a constant flow of the desorbed fluid from the storage and dispensing vessel is achieved as pressure in the storage and dispensing vessel decreases with continued dispensing operation.

2. A process according to claim 1, wherein the fluid reagent comprises a fluid selected from the group consisting of silane, diborane, arsine, phosphine, chlorine, $BCl_3$, $BF_3$, $B_2D_6$, tungsten hexafluoride, $(CH_3)_3Sb$, hydrogen fluoride, hydrogen chloride, deuterated hydrides, $GeF_4$, $SiF_4$, hydrogen iodide, hydrogen bromide, germane, ammonia, stibine, hydrogen sulfide, hydrogen selenide, hydrogen telluride, $NF_3$, and mixtures thereof.

3. A process according to claim 1, wherein the fluid reagent includes an organometallic compound, in which the organometallic compound comprises a metal moiety selected from the group consisting of aluminum, barium, strontium, gallium, indium, tungsten, antimony, silver, gold, palladium, gadolinium, calcium, lithium, potassium, cesium, titanium, yttrium, zirconium, lead, tantalum, niobium, vanadium, platinum, thallium, bismuth, tin, tellurium, selenium, nickel, zinc, tungsten, manganese, iron, cobalt, molybdenum, magnesium, scandium, chromium, copper, cadmium, lanthanum, and cerium.

4. A process for storage and dispensing of fluid sorbable on a carbon sorbent material, comprising:

providing a storage and dispensing vessel holding a carbon sorbent material;

adsorbing such fluid on the carbon sorbent material;

establishing, exteriorly of the storage and dispensing vessel, a pressure below the interior pressure, to effect desorption of sorbate fluid from the carbon sorbent material, and flowing desorbed fluid out of the storage and dispensing vessel; and cryopumping the desorbed fluid from the storage and dispensing vessel to a predetermined pressure, wherein such predetermined pressure is higher than the pressure of the desorbed fluid flowed out of the storage and dispensing vessel.

5. A process for supplying a gas reagent to an ion implantation zone, comprising:

providing a storage and dispensing vessel containing a solid-phase carbon physical sorbent medium having a physically sorptive affinity for said gas reagent;

physically sorptively loading on said solid-phase carbon physical sorbent medium a sorbate gas, to yield a sorbate gas-loaded carbon physical sorbent medium;

selectively desorbing sorbate gas from the sorbate gas-loaded carbon physical sorbent medium, by reduced pressure desorption, for dispensing thereof; and flowing the desorbed sorbate gas from the storage and dispensing vessel to the ion implantation zone.

6. An adsorption-desorption apparatus, for storage and dispensing of a sorbable fluid, said apparatus comprising:

a storage and dispensing vessel constructed and arranged for holding a solid-phase carbon sorbent material, and for selectively flowing fluid in and out of said vessel;

a solid-phase carbon sorbent material disposed in said storage and dispensing vessel at an interior gas pressure;

a sorbable fluid physically adsorbed on said solid-phase carbon sorbent material; and a dispensing assembly coupled in gas flow communication with the storage and dispensing vessel, and constructed and arranged:

(I) to provide, exteriorly of said storage and dispensing vessel, a pressure below said interior pressure, to effect desorption of sorbable fluid from the solid-phase carbon sorbent material, and fluid flow of desorbed fluid through the dispensing assembly; and/or (II) to flow thermally desorbed fluid therethrough, and comprising means for heating the solid-phase carbon sorbent material to effect desorption of the fluid therefrom, so that the desorbed fluid flows from the vessel into the dispensing assembly, said dispensing assembly comprising means for achieving a constant flow of desorbed fluid therethrough as said interior pressure in the storage and dispensing vessel decreases with continued dispensing operation.

7. Apparatus according to claim 6, wherein the carbon sorbent material has an adsorption isotherm for arsine gas, at 25° C., as a function of pressure, having an adsorption isotherm characteristic of curve A of FIG. 1 herein.

8. Apparatus according to claim 6, wherein the carbon sorbent material has an arsine gas adsorption isotherm at 25° C., as a function of pressure, with the following adsorption loading characteristic:

| Pressure, Torr | Loading (grams of arsine per liter of sorbent) of at least: |
|---|---|
| 25 | 35 |
| 50 | 75 |
| 100 | 100 |
| 200 | 160 |
| 300 | 200 |
| 400 | 225 |
| 500 | 240 |
| 550 | 250 |
| 650 | ~300. |

9. Apparatus according to claim 6, wherein the carbon sorbent material has an arsine gas adsorption isotherm at 25° C., as a function of pressure, with the following adsorption loading characteristic:

| Pressure, Torr | Loading (grams of arsine per liter of sorbent): |
|---|---|
| 25 | 35–60 |
| 50 | 75–100 |
| 100 | 100–115 |
| 200 | 160–175 |
| 300 | 200–220 |
| 400 | 225–245 |
| 500 | 240–260 |
| 550 | 250–275 |
| 650 | 260–300. |

10. Apparatus according to claim 6, wherein the carbon sorbent material has a pore volume in the range of from about 0.2 to about 2.0 cubic centimeters of pore volume per gram of sorbent material.

11. Apparatus according to claim 6, wherein the carbon sorbent material has more than 50% of its pore volume comprised of pores having a diameter in the range of from about 2 Angstroms to 100 Angstroms.

12. Apparatus according to claim 11, wherein the carbon sorbent material has more than 80% of its pore volume comprised of pores having a diameter in the range of from about 2 Angstroms to 100 Angstroms.

13. Apparatus according to claim 11, wherein the carbon sorbent material has substantially all of its pore volume comprised of pores having a diameter in the range of from about 2 Angstroms to 100 Angstroms.

14. Apparatus according to claim 6, wherein the carbon sorbent material has an average pore diameter in the range of from about 2 to about 20 Angstroms.

15. Apparatus according to claim 14, wherein the carbon sorbent material has a major fraction of the pore volume within said range of from about 2 to about 20 Angstroms.

16. Apparatus according to claim 14, wherein the carbon sorbent material has at least 80% of the pore volume within said range of from about 2 to about 20 Angstroms.

17. Apparatus according to claim 14, wherein the carbon sorbent material has substantially all of the pore volume within said range of from about 2 to about 20 Angstroms.

18. Apparatus according to claim 6, wherein the carbon sorbent material has a Sorbent Working Capacity, $C_w$, measured for arsine gas at 40 Torr and at 650 Torr, of at least 100.

19. Apparatus according to claim 6, wherein the carbon sorbent material has a Sorbent Working Capacity, $C_w$, measured for arsine gas at 40 Torr and at 650 Torr, of at least 180.

20. Apparatus according to claim 6, wherein the carbon sorbent material has a Sorbent Working Capacity, $C_w$, measured for arsine gas at 40 Torr and at 650 Torr, of at least 200.

21. Apparatus according to claim 6, wherein the carbon sorbent material has a conformation selected from the group consisting of beads, granules, pellets, tablets, powders, particulates, extrudates, cloth, web form materials, honeycomb matrix monolith, composites of the carbon sorbent with other components, and comminuted and crushed forms of said conformations of carbon sorbent materials.

22. Apparatus according to claim 6, wherein the carbon sorbent material comprises a bead activated carbon material.

23. Apparatus according to claim 6, wherein the carbon sorbent material comprises a bead activated carbon material with a particle size in the range of from about 0.1 millimeter to 1 centimeter diameter.

24. Apparatus according to claim 6, wherein the carbon sorbent material comprises a bead activated carbon material with a particle size in the range of from about 0.25 to about 2 millimeters diameter.

25. Apparatus according to claim 6, wherein the sorbable fluid is selected from the group consisting of silane, diborane, arsine, phosphine, chlorine, $BCl_3$, $BF_3$, $B_2D_6$, tungsten hexafluoride, $(CH_3)_3Sb$, hydrogen fluoride, hydrogen chloride, $GeF_4$, $SiF_4$, deuterated hydrides, hydrogen iodide, hydrogen bromide, germane, ammonia, stibine, hydrogen sulfide, hydrogen selenide, hydrogen telluride, and $NF_3$.

26. Apparatus according to claim 6, wherein the carbon sorbent material has been treated to enhance the sorptive character thereof.

27. Apparatus according to claim 26, wherein the carbon sorbent material has been treated to functionalize the surface of the sorbent with chemical moieties which enhance (1) sorption of a specific fluid on the sorbent medium when the sorbent is originally loaded with the fluid to be subsequently dispensed, and/or (2) desorption of the fluid when the sorbent is subjected to process conditions for dispensing the fluid from the storage and dispensing vessel.

28. Apparatus according to claim 6, wherein the carbon sorbent material has been treated by application of a sorption-enhancing material on the surfaces thereof to enhance the sorptive character of the material.

29. Apparatus according to claim 6, further comprising a chemisorbent material in the storage and dispensing vessel having affinity for contaminants that are adverse to sorptive efficacy of the sorbent material.

30. Apparatus according to claim 29, wherein said chemisorbent is selected from the group consisting of:

(A) scavengers including a support having associated therewith, but not covalently bonded thereto, a compound which in the presence of such contaminant provides an anion which is reactive to effect the removal of such contaminant, said compound being selected from one or more members of the group consisting of:
  (i) carbanion source compounds whose corresponding protonated carbanion compounds have a $pK_a$ value of from about 22 to about 36; and
  (ii) anion source compounds formed by reaction of said carbanion source compounds with the sorbate gas; and
(B) scavengers comprising:
  (i) an inert support having a surface area in the range of from about 50 to about 1000 square meters per gram, and thermally stable up to at least about 250° C.; and
  (ii) an active scavenging species, present on the support at a concentration of from about 0.01 to about 1.0 moles per liter of support, and formed by the deposition on the support of a Group IA metal selected from sodium, potassium, rubidium, and cesium and their mixtures and alloys and pyrolysis thereof on said support.

31. Apparatus according to claim 29, wherein said chemisorbent is selected from the group consisting of tritylllithium and potassium arsenide.

32. Apparatus according to claim 29, wherein said chemisorbent is present as a separate bed of chemisorbent material in fluid flow communication with the carbon sorbent material in said storage and dispensing vessel.

33. Apparatus according to claim 29, wherein said chemisorbent is dispersed in the carbon sorbent material in the storage and dispensing vessel.

34. Apparatus according to claim 6, wherein said means for achieving a constant flow of desorbed fluid comprise a mass flow controller.

35. Apparatus according to claim 6, wherein said dispensing assembly comprises a valved purgeable manifold which is constructed and arranged for gas purging prior to active operation dispensing of said sorbable fluid.

36. An adsorption-desorption apparatus, for storage and dispensing of a gas, comprising:

a storage and dispensing vessel constructed and arranged for holding a solid-phase carbon sorbent material, and for selectively flowing gas into and out of said vessel;

a solid-phase carbon sorbent material disposed in said storage and dispensing vessel at a sub-atmospheric interior gas pressure;

a sorbate fluid physically adsorbed on said carbon sorbent material at said sub-atmospheric interior gas pressure;

a dispensing assembly coupled in gas flow communication with the storage and dispensing vessel, and constructed and arranged for selective on-demand dispensing of desorbed fluid, after thermal and/or pressure differential-mediated desorption of the fluid from the carbon sorbent material, with the dispensing assembly being constructed and arranged:

(I) to provide, exteriorly of said storage and dispensing vessel, a pressure below said interior pressure, to effect desorption of fluid from the carbon sorbent material, and flow of desorbed fluid from the vessel through the dispensing assembly; and/or (II) to flow thermally desorbed fluid therethrough, and comprising means for heating the carbon sorbent material to effect desorption of the fluid therefrom, so that the desorbed fluid flows from the vessel into the dispensing assembly, wherein the carbon sorbent material is devoid of trace components selected from the group consisting of water, metals, and oxidic transition metal species sufficient in concentration to decompose the sorbate fluid in said storage and dispensing vessel.

37. Apparatus according to claim 36, wherein the concentration on the carbon sorbent material of trace components selected from the group consisting of water and oxidic transition metal species, is insufficient to decompose more than 5% by weight of the sorbate fluid after 1 year at 25° C. and said interior pressure.

38. Apparatus according to claim 36, wherein the concentration on the carbon sorbent material of trace components selected from the group consisting of water and oxidic transition metal species, is insufficient to decompose more than 1% by weight of the sorbate fluid after 1 year at 25° C. and said interior pressure.

39. Apparatus according to claim 36, wherein the concentration on the carbon sorbent material of trace components selected from the group consisting of water, metals, and oxidic transition metal species, based on the weight of the carbon sorbent material, is insufficient to cause decomposition of the sorbate fluid resulting in more than a 25% rise in interior pressure after 1 week at 25° C. in the storage and dispensing vessel.

40. Apparatus according to claim 36, wherein the concentration on the carbon sorbent material of trace components selected from the group consisting of water, metals, and oxidic transition metal species, based on the weight of the carbon sorbent material, is insufficient to cause decomposition of the sorbate fluid resulting in more than a 10% rise in interior pressure after 1 week at 25° C. in the storage and dispensing vessel.

41. Apparatus according to claim 36, wherein the carbon sorbent material contains less than 350 part(s)-per-million by weight of trace components selected from the group consisting of water and oxidic transition metal species, based on the weight of the carbon sorbent material.

42. Apparatus according to claim 36, wherein the carbon sorbent material contains less than 100 part(s)-per-million by weight of trace components selected from the group consisting of water and oxidic transition metal species, based on the weight of the carbon sorbent material.

43. Apparatus according to claim 36, wherein the carbon sorbent material contains less than 10 part(s)-per-million by weight of trace components selected from the group consisting of water and oxidic transition metal species, based on the weight of the carbon sorbent material.

44. Apparatus according to claim 36, wherein the carbon sorbent material contains less than 1 part-per-million by weight of trace components selected from the group consisting of water and oxidic transition metal species, based on the weight of the carbon sorbent material.

45. An adsorption-desorption apparatus, for storage and dispensing of fluid sorbable on a carbon sorbent material, comprising:
- a storage and dispensing vessel constructed and arranged for holding a carbon sorbent material, and for selectively flowing fluid into and out of the vessel;
- a carbon sorbent material disposed in the storage and dispensing vessel at an interior fluid pressure;
- a sorbate fluid physically adsorbed on the carbon sorbent material;
- a dispensing assembly coupled in fluid flow communication with the storage and dispensing vessel, and constructed and arranged to provide, exteriorly of the storage and dispensing vessel, a pressure below said interior pressure, to effect desorption of sorbate gas from the carbon sorbent material, and gas flow of desorbed gas through the dispensing assembly; and
- a cryopump coupled to the dispensing assembly for pressurizing the desorbed gas and discharging the resultingly pressurized gas.

46. An ion implantation system, comprising a reagent source for reagent source material and an ion implantation apparatus coupled in gas flow communication with said reagent source, and wherein the reagent source comprises:
- an adsorption-desorption apparatus, for storage and dispensing of a gas, said apparatus comprising:
- a storage and dispensing vessel constructed and arranged for holding a solid-phase carbon sorbent material, and for selectively flowing gas into and out of said vessel;
- a solid-phase carbon sorbent material disposed in said storage and dispensing vessel at an interior gas pressure;
- a sorbate gas physically adsorbed on said solid-phase carbon sorbent material; and
- a dispensing assembly interconnecting the storage and dispensing vessel and said ion implantation apparatus in gas flow communication with one another, and constructed and arranged to provide, exteriorly of said storage and dispensing vessel, a pressure below said interior pressure, to effect desorption of sorbate gas from the solid-phase carbon sorbent material, and gas flow of desorbed gas through the dispensing assembly to the ion implantation apparatus.

47. An ion implantation system including (1) an ion implantation zone and (2) an adsorption-desorption apparatus, for storage and dispensing of a sorbable fluid, said adsorption-desorption apparatus comprising:
- a storage and dispensing vessel constructed and arranged for holding a solid-phase carbon sorbent material, and for selectively flowing fluid into and out of said vessel;
- a solid-phase carbon sorbent material disposed in said storage and dispensing vessel at an interior gas pressure;
- a sorbable fluid physically adsorbed on said solid-phase carbon sorbent material; and
- means for selectively desorbing the sorbable fluid from said solid-phase carbon sorbent material and flowing same to the ion implantation zone.

48. An adsorption-desorption apparatus, for storage and dispensing of a sorbable fluid, said adsorption-desorption apparatus comprising:
- a storage and dispensing vessel constructed and arranged for holding a solid-phase carbon sorbent material, and for selectively flowing fluid into and out of said vessel;
- a solid-phase carbon sorbent material disposed in said storage and dispensing vessel at an interior gas pressure;
- a sorbable fluid physically adsorbed on said solid-phase carbon sorbent material;
- means for selectively desorbing the sorbable fluid from said solid-phase carbon sorbent material and dispensing desorbed sorbable fluid from said storage and dispensing vessel, said means including a mass flow controller for achieving a constant flow of desorbed fluid therethrough as said interior pressure in the storage and dispensing vessel decreases with continued dispensing operation.

49. Apparatus according to claim 48, wherein the carbon sorbent material has an average pore diameter in the range of from about 10 to about 20 Angstroms, and a major fraction of its pore volume in such range.

50. Apparatus according to claim 48, wherein the sorbable fluid comprises a fluid selected from the group consisting of silane, diborane, arsine, phosphine, chlorine, $BCl_3$, $BF_3$, $B_2D_6$, tungsten hexafluoride, $(CH_3)_3Sb$, hydrogen fluoride, hydrogen chloride, deuterated hydrides, $GeF_4$, $SiF_4$, hydrogen iodide, hydrogen bromide, germane, ammonia, stibine, hydrogen sulfide, hydrogen selenide, hydrogen telluride, $NF_3$, and organometallic compounds comprising a metal moiety selected from the group consisting of aluminum, barium, strontium, gallium, indium, tungsten, antimony, silver, gold, palladium, gadolinium, calcium, lithium, potassium, cesium, titanium, yttrium, zirconium, lead, tantalum, niobium, vanadium, platinum, thallium, bismuth, tin, tellurium, selenium, nickel, zinc, tungsten, manganese, iron, cobalt, molybdenum, magnesium, scandium, chromium, copper, cadmium, lanthanum, and cerium.

* * * * *